US012085262B2

(12) United States Patent
Gromotka et al.

(10) Patent No.: US 12,085,262 B2
(45) Date of Patent: Sep. 10, 2024

(54) APPARATUS, METHOD, AND SYSTEM FOR REDUCING MOISTURE IN LED LIGHTING FIXTURES

(71) Applicant: Musco Corporation, Oskaloosa, IA (US)

(72) Inventors: Gabriel P. Gromotka, Pella, IA (US); Kurt C. Herr, Jr., Centerville, IA (US); Luke C. McKee, Oskaloosa, IA (US)

( * ) Notice: Subject to any disclaimer, the term of this patent is extended or adjusted under 35 U.S.C. 154(b) by 0 days.

(21) Appl. No.: 18/306,586

(22) Filed: Apr. 25, 2023

(65) Prior Publication Data

US 2023/0258318 A1 Aug. 17, 2023

Related U.S. Application Data

(63) Continuation of application No. 17/303,240, filed on May 25, 2021, now Pat. No. 11,655,966, which is a (Continued)

(51) Int. Cl.

*F21V 15/00* (2015.01)
*F21V 3/04* (2018.01)

(Continued)

(52) U.S. Cl.

CPC ................ *F21V 15/00* (2013.01); *F21V 3/04* (2013.01); *F21V 29/763* (2015.01); *F21Y 2115/10* (2016.08)

(58) Field of Classification Search

CPC .......... F21V 15/00; F21V 3/04; F21V 29/763; F21V 31/03; F21V 31/04; F21Y 2115/10; F21W 2131/10

See application file for complete search history.

(56) References Cited

U.S. PATENT DOCUMENTS 3,809,942 A * 5/1974 Boekkooi ............... F21S 41/29 313/553
4,612,607 A 9/1986 Segoshi et al.

(Continued)

FOREIGN PATENT DOCUMENTS

CN 108826021 A 11/2018
CN 109114460 A 1/2019

(Continued)

OTHER PUBLICATIONS

International Searching Authority in connection with PCT/US2020/013324 filed Jan. 13, 2020, "The International Search Report and the Written Opinion of the International Searching Authority, or the Declaration", 13 pages, mailed May 8, 2020.

(Continued)

*Primary Examiner* — Zheng Song
*Assistant Examiner* — Glenn D Zimmerman
(74) *Attorney, Agent, or Firm* — Kurt J. Fugman; Zachary S. Pratt

(57) ABSTRACT

Sealed LED lighting fixtures operated under certain conditions (e.g., outdoors, in cold ambient environments, at high operating current, and/or in non-hermetic environments) will oftentimes exhibit condensation on an inner surface of the emitting face of the fixture. When occurring, said condensation impairs the ability to produce useful light—namely, light harnessed and directed in a manner so to provide lighting for a task (or otherwise desired)—by diffusing light emitted from the lighting fixture. Envisioned are apparatus, methods, and systems to reduce moisture in sealed LED lighting fixtures so to reduce or eliminate condensation, and in a manner that addresses both fixtures already in the field and those being assembled in a factory setting. In one form, a carrier embedded with desiccant is positionally mounted inside the fixture in a desired position (Continued)

which has no or minimal impact on light output from the fixture.

1 Claim, 40 Drawing Sheets

Related U.S. Application Data continuation-in-part of application No. 16/741,049, filed on Jan. 13, 2020, now Pat. No. 11,192,063.

(60) Provisional application No. 62/799,281, filed on Jan. 31, 2019, provisional application No. 62/791,941, filed on Jan. 14, 2019.

(51) Int. Cl.

| | |
|---|---|
| ***F21V 29/76*** | (2015.01) |
| *F21Y 115/10* | (2016.01) |

(56) References Cited

U.S. PATENT DOCUMENTS

| | | | | |
|---|---|---|---|---|
| 4,796,163 | A | 1/1989 | Dressler | |
| 4,809,144 | A | 2/1989 | Suzuki | |
| 6,226,890 | B1 * | 5/2001 | Boroson | F26B 21/083 252/194 |
| 9,803,415 | B2 | 10/2017 | Ferri et al. | |
| 2002/0170437 | A1 * | 11/2002 | DeGuiseppi | F21S 45/33 96/147 |
| 2005/0098475 | A1 | 5/2005 | Dick et al. | |
| 2005/0105300 | A1 | 5/2005 | Pajer et al. | |
| 2005/0157514 | A1 | 7/2005 | Brinkmann | |
| 2006/0150817 | A1 * | 7/2006 | DeGuiseppi | F21S 45/33 96/108 |
| 2008/0191603 | A1 | 8/2008 | Kubota | |
| 2009/0122570 | A1 | 5/2009 | Hsu et al. | |
| 2010/0020541 | A1 * | 1/2010 | Incorvia | F21V 31/00 362/249.01 |
| 2014/0321125 | A1 | 10/2014 | Takeuchi | |
| 2015/0241009 | A1 | 8/2015 | Brendle | |
| 2018/0266663 | A1 | 9/2018 | Monestier et al. | |
| 2019/0271449 | A1 * | 9/2019 | Helwig | B01D 53/261 |
| 2020/0222849 | A1 | 7/2020 | Gromotka et al. | |

FOREIGN PATENT DOCUMENTS

| | | | | | |
|---|---|---|---|---|---|
| EP | 0449219 | A1 | | 10/1991 | |
| JP | 2007019070 | A | | 1/2007 | |
| JP | 2008159375 | A | * | 7/2008 | B60Q 1/007 |
| KR | 2003074295 | A | * | 9/2003 | H01L 51/5259 |
| KR | 101453290 | B1 | | 11/2014 | |
| WO | 02077522 | A2 | | 10/2002 | |
| WO | 2011135996 | A1 | | 11/2011 | |
| WO | 2013152286 | A1 | | 10/2013 | |

OTHER PUBLICATIONS

Van Den Bergh et al., "Window Spacers and Edge Seals in Insulating Glass Units: A State-of-the-Art Review and Future Perspectives", Energy and Buildings, vol. 58, pp. 263-280, published Jan. 2013.

Korean Intellectual Property Office, "Notice to File a Response" in connection with Korean Application No. 10-2021-0067100 filed May 25, 2021, 9 pages, mailed Jul. 20, 2021.

English Translation of Korean Intellectual Property Office, "Notice to File a Response" in connection with Korean Application No. 10-2021-0067100 filed May 25, 2021, 10 pages, mailed Jul. 20, 2021.

International Searching Authority in connection with PCT/US2021/033987 filed May 25, 2021, "The International Search Report and the Written Opinion of the International Searching Authority, or the Declaration", mailed Feb. 23, 2022.

European Patent Office in connection with Application No. 20741767.6 filed Apr. 21, 2022, "Extended European Search Report", completed Apr. 21, 2022.

Espacenet English Abstract of CN108826021A, filed May 5, 2018 (2 pages) and Espacenet machine translation of published CN108826021A (10 pages), published Nov. 16, 2018.

Espacenet English Abstract of WO2011135996A1, filed Apr. 7, 2011 (38 pages) and Espacenet machine translation of published WO2011135996A1 (19 pages), published Nov. 3, 2011.

* cited by examiner

10000

APPARATUS, METHOD, AND SYSTEM FOR REDUCING MOISTURE IN LED LIGHTING FIXTURES

CROSS-REFERENCE TO RELATED APPLICATIONS

This application is a continuation of U.S. application Ser. No. 17/303,240, filed May 25, 2021, which is a continuation-in-part of U.S. application Ser. No. 16/741,049, filed Jan. 13, 2020, which claims priority under 35 U.S.C. § 119 to provisional U.S. application Ser. No. 62/791,941, filed Jan. 14, 2019, and provisional U.S. application Ser. No. 62/799,281, filed Jan. 31, 2019, all of which are hereby incorporated by reference in their entireties.

TECHNICAL FIELD

The present invention generally relates to removing moisture from lighting fixtures. More specifically, the present invention relates to (i) in situ or field repairs of lighting fixtures which exhibit internal condensation under at least some conditions, and to (ii) apparatus, methods, and systems implemented in a factory setting so to avoid or minimize adverse impact from moisture in lighting fixtures.

BACKGROUND

It is well known that lighting fixtures are designed to not only produce light, but produce useful light; namely, light harnessed and directed in a manner so to provide lighting for a task (or otherwise desired). For the example of sports lighting, lighting fixtures are mounted high above a field or other target area, aimed generally towards some portion of the field (or space above the field) at both a horizontal and vertical angle sufficient to light the target area but not so severe as to cause glare along common player lines of sight. The light projected from each fixture in an array of such elevated and aimed fixtures is specifically designed to provide a beam of particular dimensions and intensity. In this manner, lighting specifications are met by layering a number of these beams from a number of elevated lighting fixtures so to create a composite beam. So it can be seen that misalignment of any of the many lighting fixtures in an array can adversely impact the composite beam, and by extension, cause a failure in meeting specifications. However, the same undesirable outcome can be produced when the light emitted from any of the many lighting fixtures is adversely impacted such that the individual beam is not of the desired dimensions and intensity.

Lighting fixtures such as the aforementioned rely on a number of different light directing devices (e.g., secondary lenses) and light redirecting devices (e.g., reflectors) to harness the light emitted from the light sources (e.g., a plurality of LEDs) and shape/direct it into light which is useful for an application. Light directing devices and light redirecting devices may be installed in a lighting fixture housing (e.g., proximate the light sources), outside a lighting fixture housing (e.g., proximate the emitting face of the lighting fixture housing), or both. Particularly for LEDs, it is not possible to produce useful light without employing a number of light directing and/or light redirecting devices.

Herein lies a problem. In the current state of the art, new models of LEDs are being developed that are more rugged, of higher efficacy, and can operate at higher temperatures; this requires in-kind development of light directing devices and light redirecting devices to realize these benefits. Transitioning to different materials in light directing and/or light redirecting devices for higher temperature purposes (e.g., switching from acrylic secondary lenses to higher operating temperature silicone secondary lenses) has produced a phenomenon in which, under some operating conditions, LED lighting fixtures exhibit condensation. Said condensation collects on the inside of the emitting face of the fixture housing and adversely impacts the production of useful light by, e.g., diffusing light. Thus, there is room for improvement in the art.

Areas of improvement include one or more of (a) more effective moisture removal by ability to place desiccant proximate areas of concern inside fixtures without interference with light output of the fixtures, (b) ability to efficiently install in original equipment manufacturing (OEM) and/or in situ after installation, as well as repair and maintain functionalities; and (c) economy in terms of cost of materials originally and over useful or normal operating life of lighting fixtures as well as manufacturing, assembly, and operation.

SUMMARY

Under some operating conditions of LED lighting fixtures, a phenomenon has been observed wherein condensation forms on the inner side of the emitting face of the fixture housing. Condensation has been particularly observed in LED lighting fixtures operated outdoors in cold environments, particularly in specialty LED lighting fixtures that have a large number of light directing and/or light redirecting devices, and/or are operated at high current (which correlates to a higher internal housing temperature)—though it is possible condensation could occur under other operating conditions. It is believed that in the transition to higher operating temperatures, operating conditions, and materials, more moisture is released, evaporated, or otherwise produced during normal fixture operation, and when normal fixture operation occurs in a cold ambient environment, said release of moisture results in condensation; this is because said fixtures are sealed at the factory prior to shipping (e.g., to deter theft, to prevent dirt from coating light directing and/or light redirecting devices) and so moisture is trapped within the internal space of the fixture housing. A rough analogy is instructive. Sufficient raising of the temperature of a metal pot of cold water on a stove, with a glass lid or cover, can eventually results in some change of liquid state to gas state. This evaporation then results in condensation on the interior side of the glass lid or cover. Similarly, in the present context, condensation or other moisture formation on any part of a glass at the emitting face of a lighting fixture would also affect the transmission of light from the sources inside the lighting fixture through the glass due to the condensation.

To date, there is no known commercially available solution to correcting or preventing this phenomenon. For example, commercially implemented membrane vents which have long been used with sealed LED lighting fixtures are effective at maintaining a desired pressure in a sealed LED lighting fixture, but have not been shown to provide a similar benefit to maintaining a desired moisture level. In fact, in outdoor or non-hermetic/environmentally controlled environments, the presence of a membrane vent can actually cause moisture ingress over time. Also, it is not viable to simply leave lighting fixtures unsealed because, as discussed, dirt can accumulate on light directing and/or light redirecting devices and adversely impact the production of useful light by, e.g., diffusing light or reducing transmission efficiency.

It is therefore a principle object, feature, advantage, or aspect of the present invention to improve over the state of the art and/or address problems, issues, or deficiencies in the art.

Envisioned are apparatus, methods, and systems for retrofitting or otherwise modifying sealed LED lighting fixtures already in operation (i.e., in situ) to reduce moisture which can cause condensation under at least some operating conditions. An LED lighting fixture field-modified in this manner is then sealed and operated until its natural end of life. As envisioned, by reducing moisture, moisture is not removed from the fixture entirely; rather, it is absorbed by desiccant material exposed to an internal space of the fixture so it is not available to cause condensation and impact the usefulness of light produced from the lighting fixture. This is important to note because future operation of the LED lighting fixture will result in the ingress of moisture (e.g., via a membrane vent), and so by leaving the desiccant in the lighting fixture (or otherwise exposed to the internal space of the lighting fixture) there is an opportunity to provide ongoing reduction of moisture which can cause condensation. This can include a sufficient type, quantity, and moisture-gathering capacity of desiccant material to effectively function without maintenance or change-out for a predicted or normal operating life of the fixture, which could be years if not decades.

Further envisioned as an aspect of the invention are methods, apparatus, and systems for producing in OEM or in situ retrofitting moisture-reducing assemblies inside lighting fixtures which utilize a carrier of embedded desiccant to allow flexibility and ease of fitting at specific locations within the fixture—without material effect of fixture light output or operation.

Further objects, features, advantages, or aspects of the present invention may include one or more of the following:

a. adaptation and application of the aforementioned apparatus, methods, and systems for a fixture fabrication, assembly, or testing factory setting (e.g., to avoid the phenomenon entirely);
b. adaptation and application of the aforementioned apparatus, methods, and systems across a range of desiccant material forms, compositions, and capacity to absorb moisture;
c. adaptation and application of the aforementioned apparatus, methods, and systems across a range of means for affixing desiccant material in situ or in original equipment manufacturing (OEM) relative to the internal space of a lighting fixture; and
d. apparatus, methods, and systems for determining an adequate amount of said desiccant material regardless of the source of said moisture for given intended operating conditions and useful or normal operating life.

These and other objects, features, advantages, or aspects of the present invention will become more apparent with reference to the accompanying specification and claims.

BRIEF DESCRIPTION OF DRAWINGS

The following drawings are illustrative of particular examples of the present disclosure and therefore do not limit the scope of the disclosure. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

FIG. 1 illustrates a perspective view, FIG. 2 illustrates a front view, FIG. 3 illustrates a back view, FIG. 4 illustrates a right side view, FIG. 5 illustrates a left side view, FIG. 6 illustrates a top view, and FIG. 7 illustrates a bottom view. Note that in FIG. 7 the emitting face glass is hatched to indicate it is light transmissive but features normally viewable through the glass are not illustrated (though this is merely for convenience).

FIG. 8 illustrates a front perspective view more or less in a correct operational orientation (e.g., 30 degrees down from horizontal) and FIG. 9 illustrates a reduced-in-scale partially exploded front perspective view; note that for clarity no LEDs, LED boards, light directing and/or light redirecting devices, or electrical connections are illustrated.

FIG. 10 illustrates a front perspective view more or less in a correct operational orientation (e.g., 30 degrees down from horizontal) and FIG. 11 illustrates a reduced-in-scale partially exploded front perspective view; note that for clarity no LEDs, LED boards, light directing and/or light redirecting devices, or electrical connections are illustrated.

FIG. 12 illustrates a perspective view more or less in a correct operational orientation (e.g., 30 degrees down from horizontal) and FIG. 13 illustrates a reduced-in-scale partially exploded perspective view; note that for clarity no LEDs, LED boards, light directing and/or light redirecting devices, electrical connections, or desiccant are illustrated, and further note that for clarity some fastening devices and explosion lines have been omitted.

FIG. 14 illustrates a perspective view more or less in a correct operational orientation (e.g., 30 degrees down from horizontal) and FIG. 15 illustrates a reduced-in-scale partially exploded perspective view; note that for clarity no LEDs, LED boards, light directing and/or light redirecting devices, electrical connections, or desiccant are illustrated, and further note that for clarity some fastening devices and explosion lines have been omitted.

FIG. 19 illustrates a front perspective view, FIG. 20 illustrates a front view, FIG. 21 illustrates a back view, FIG. 22 illustrates a right side view, FIG. 23 illustrates a left side view, FIG. 24 illustrates a top view, and FIG. 25 illustrates a bottom view. Note that in FIGS. 19 and 20 the emitting face glass is hatched to indicate it is light transmissive but features normally viewable through the glass are not illustrated (though this is merely for convenience).

FIG. 26 illustrates a partially exploded back perspective view, and FIG. 27 illustrates an enlarged, isolated, back perspective view of this embodiment as installed on a housing of the lighting fixture of FIGS. 19-25; note that for clarity no LEDs, LED boards, light directing and/or light redirecting devices, or electrical connections are illustrated.

FIG. 28 illustrates a perspective view, FIG. 29 illustrates a front view, FIG. 30 illustrates a back view, FIG. 31 illustrates a right side view, FIG. 32 illustrates a left side view, FIG. 33 illustrates a top view, and FIG. 34 illustrates a bottom view. Note that in FIGS. 28 and 29 the emitting face glass is hatched to indicate it is light transmissive but features normally viewable through the glass are not illustrated (though this is merely for convenience).

FIG. 35 illustrates a partially exploded perspective view; note that for clarity no LEDs, LED boards, light directing and/or light redirecting devices, or electrical connections are illustrated. FIG. 36 illustrates an enlarged, isolated, rotated 180 degrees, perspective view of this embodiment as installed on the thermally conductive substrate which acts as the mounting surface for the LEDs of the lighting fixture of FIGS. 28-34.

DETAILED DESCRIPTION

Figure 1:
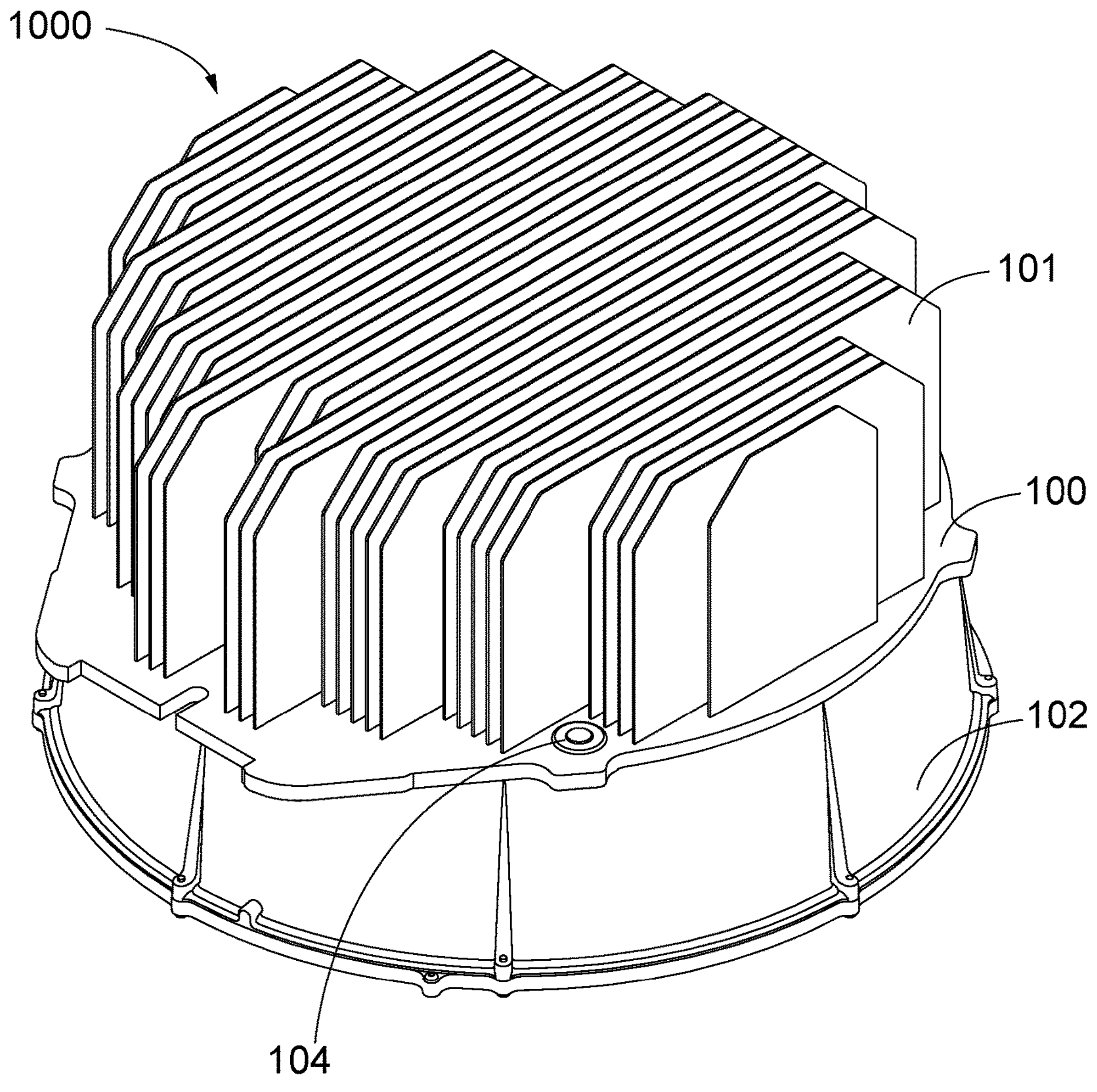
FIGS. 1-7 illustrate various views of a typical outdoor and/or specialty LED lighting fixture which might experience condensation under at least some operating conditions; note that FIGS. 1-7 do not illustrate the lighting fixture in any particular operational orientation/aiming.
Figure 2:
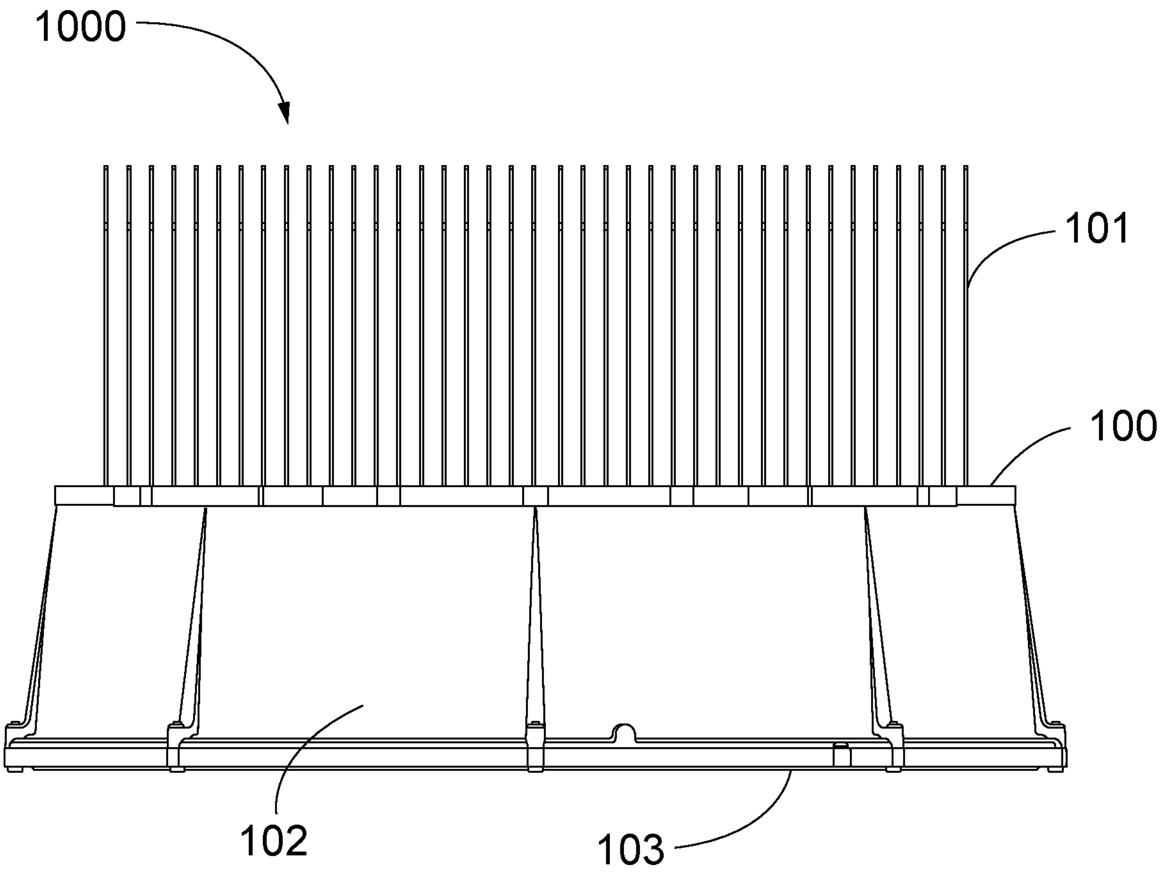
Figure 3:
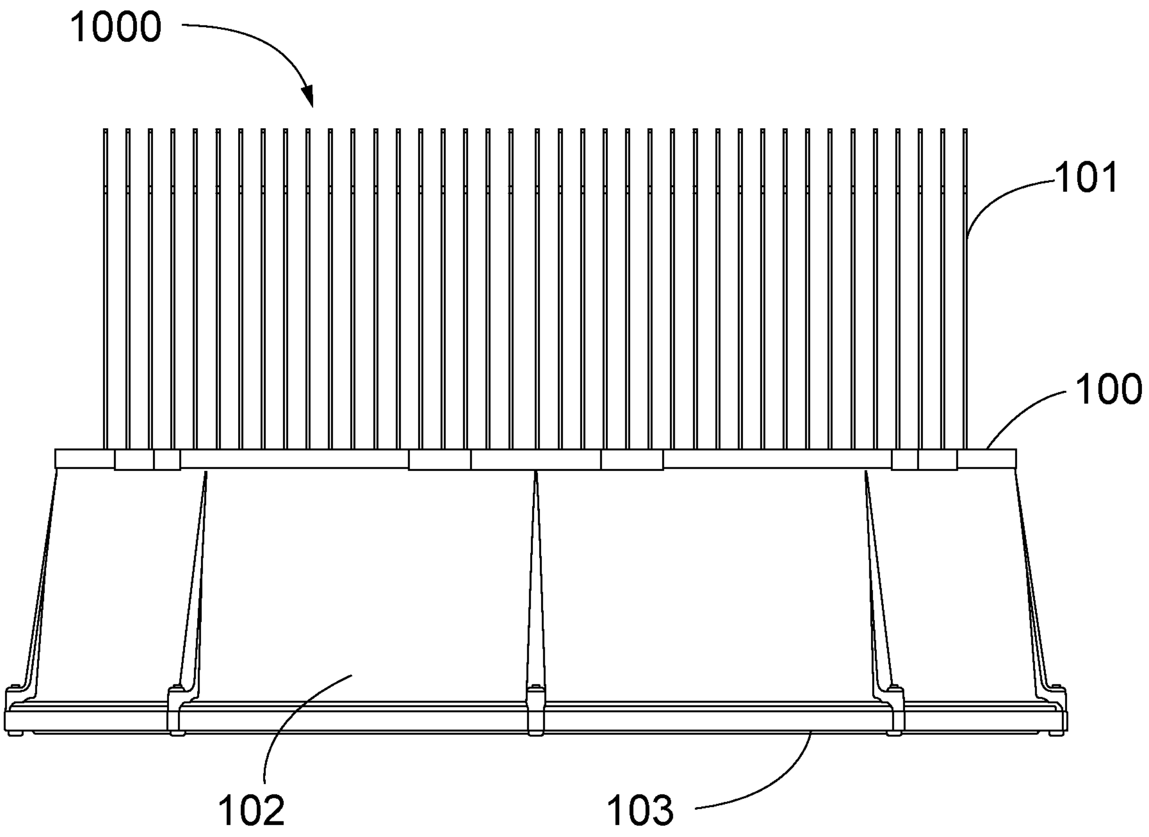
Figure 4:
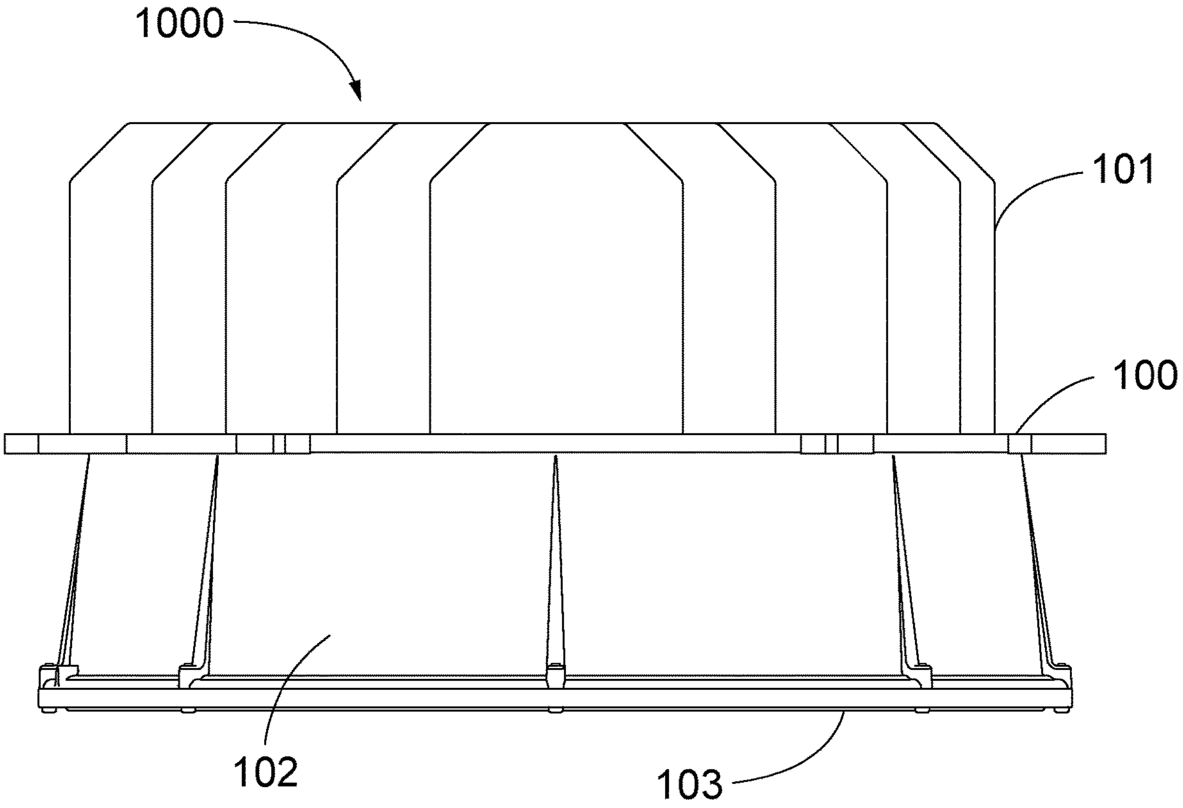
Figure 5:
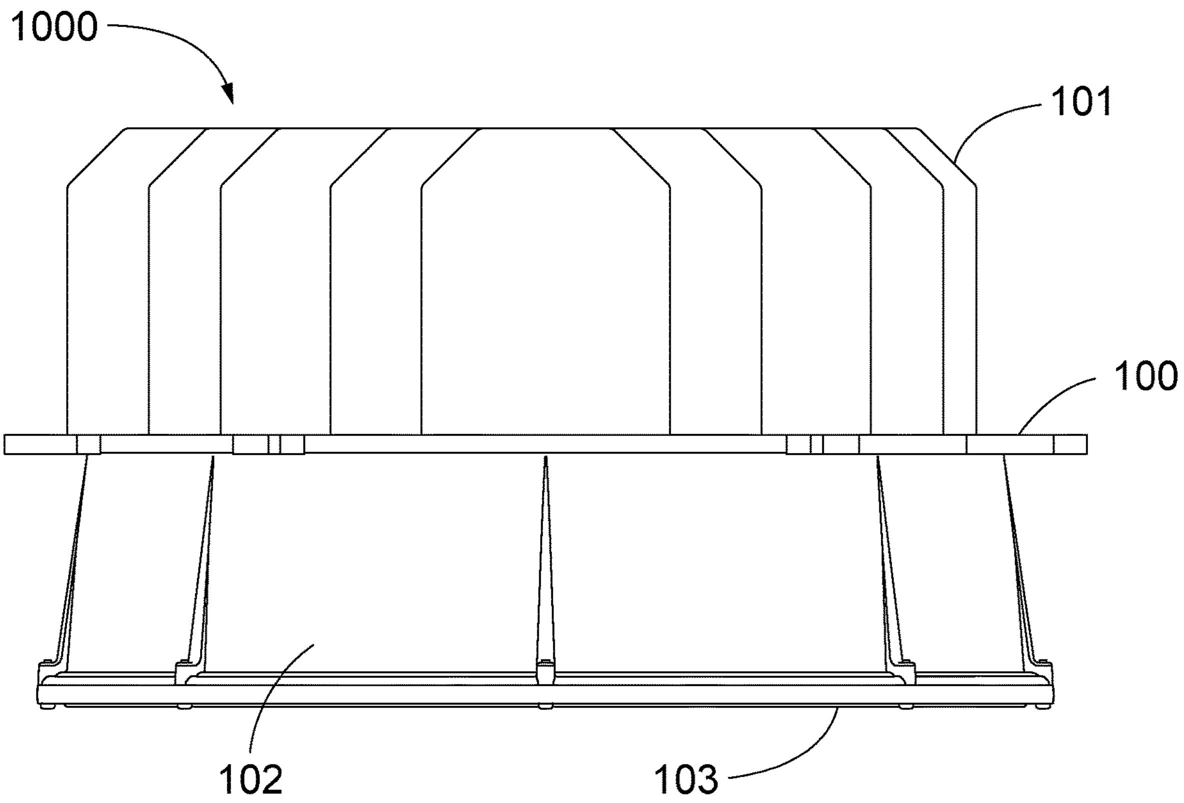
Figure 6:
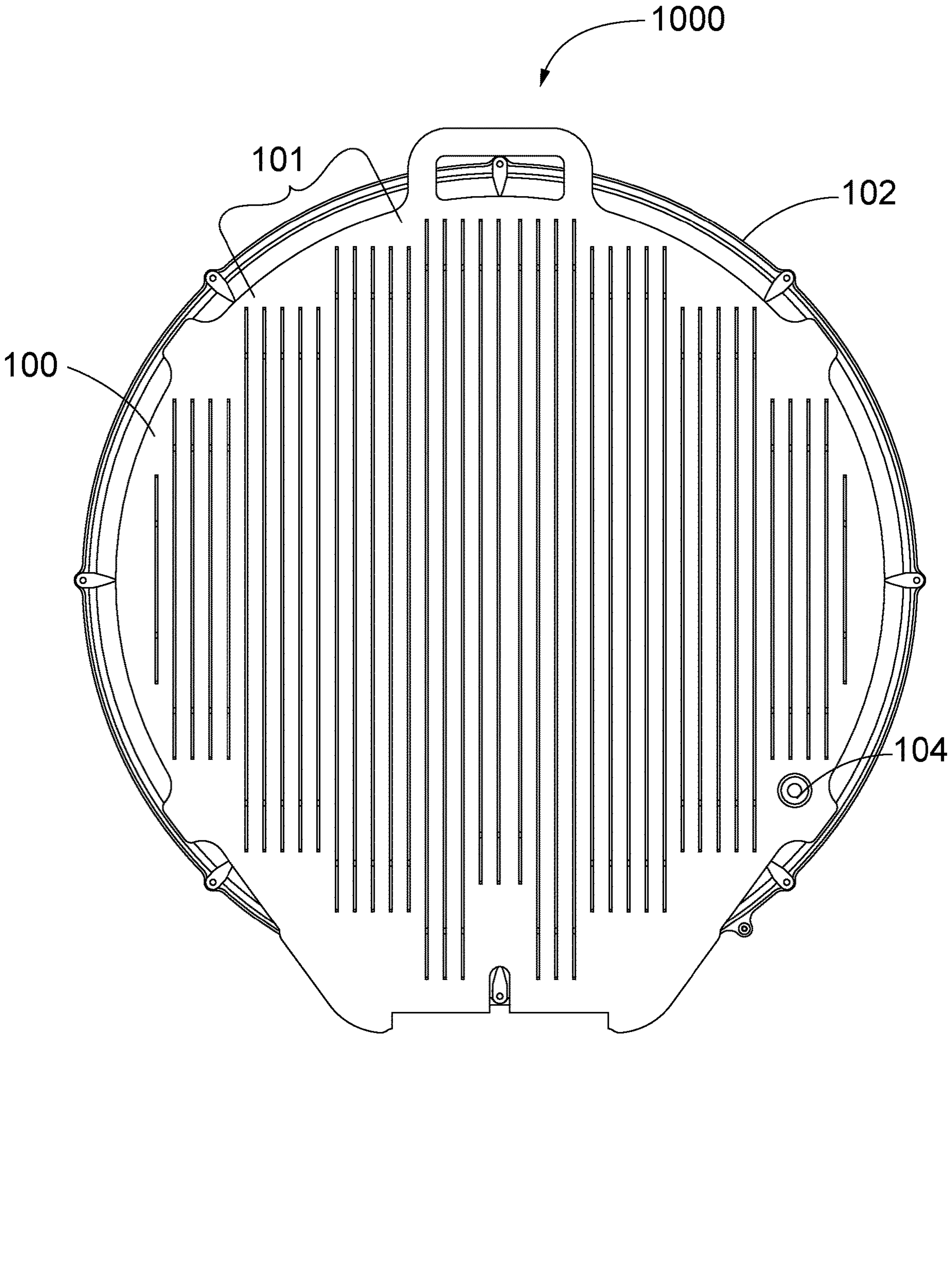
Figure 7:
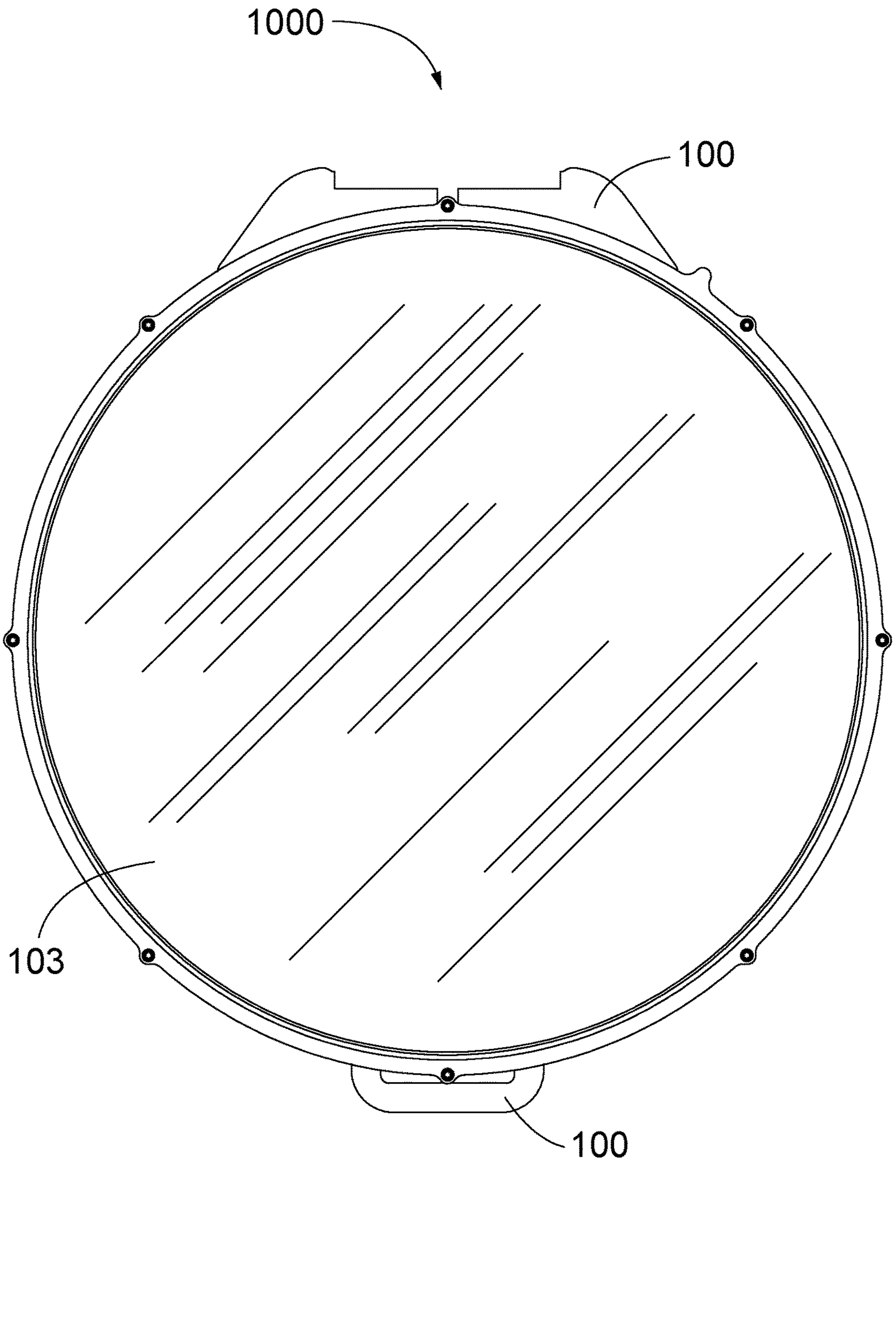

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

A. Overview

To further an understanding of the present invention, specific exemplary embodiments according to the present invention will be described in detail. Frequent mention will be made in this description to the drawings. Reference numbers will be used to indicate certain parts in the drawings. Unless otherwise stated, the same reference numbers will be used to indicate the same parts throughout the drawings. Also, similar parts between embodiments—for example, the glass at the emitting face of the lighting fixtures, which is a common feature between all embodiments—will have similar reference numbers; for this example, following an "X03" notation where "X" is a number (e.g., 103, 203, and 803). Lastly, FIGS. 17, 18A-C, and 38 are reproduced from U.S. Patent Publication No. 2014/0092593 incorporated by reference herein; those figures have been reproduced faithfully and so, unless otherwise explicitly stated herein, any reference numbers contained in FIGS. 17, 18A-C, and 38 should be taken with respect to the specification of U.S. Patent Publication No. 2014/0092593. Specifically, reference nos. 10, 10A, 10B, 10C, 10D, 10E, 10F, 10H, 300B, 301, 302, and 303 of FIG. 17, reference nos. 10, 200, 300A, and 300C of FIGS. 18A-C, and reference nos. 100, 200, 300, 400, and 1000 of FIG. 38 refer to various fixture components or locations that are further discussed in U.S. Patent Publication No. 2014/009259.

Figure 36:
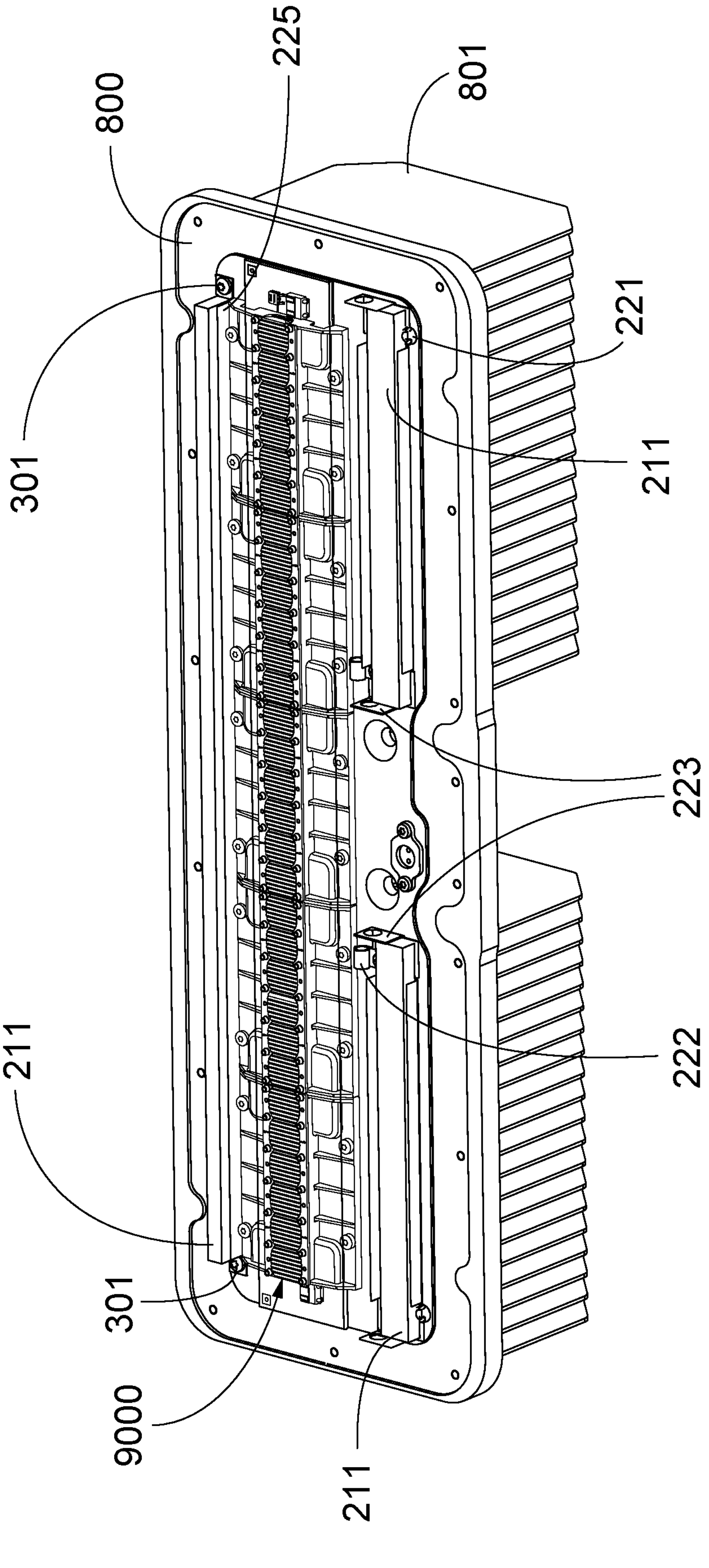

Regarding terminology, the terms "lens" and "glass" are used herein to describe different parts, though they are sometimes used interchangeably in the art. Generally speaking, as described herein, an LED light source includes an integral primary lens, might include a secondary lens (e.g., for beam shaping), and a fixture itself includes a glass or similar member to close (and optionally, seal) against an opening into a housing where a plurality of LEDs with their associated primary and secondary lenses are housed (i.e., over at least a portion of an emitting face). As a specific example, FIG. 36 illustrates an array of LED light sources 9000 each of which includes one or more LEDs (with integral primary lens) and a secondary lens; in practice array

Figure 35:
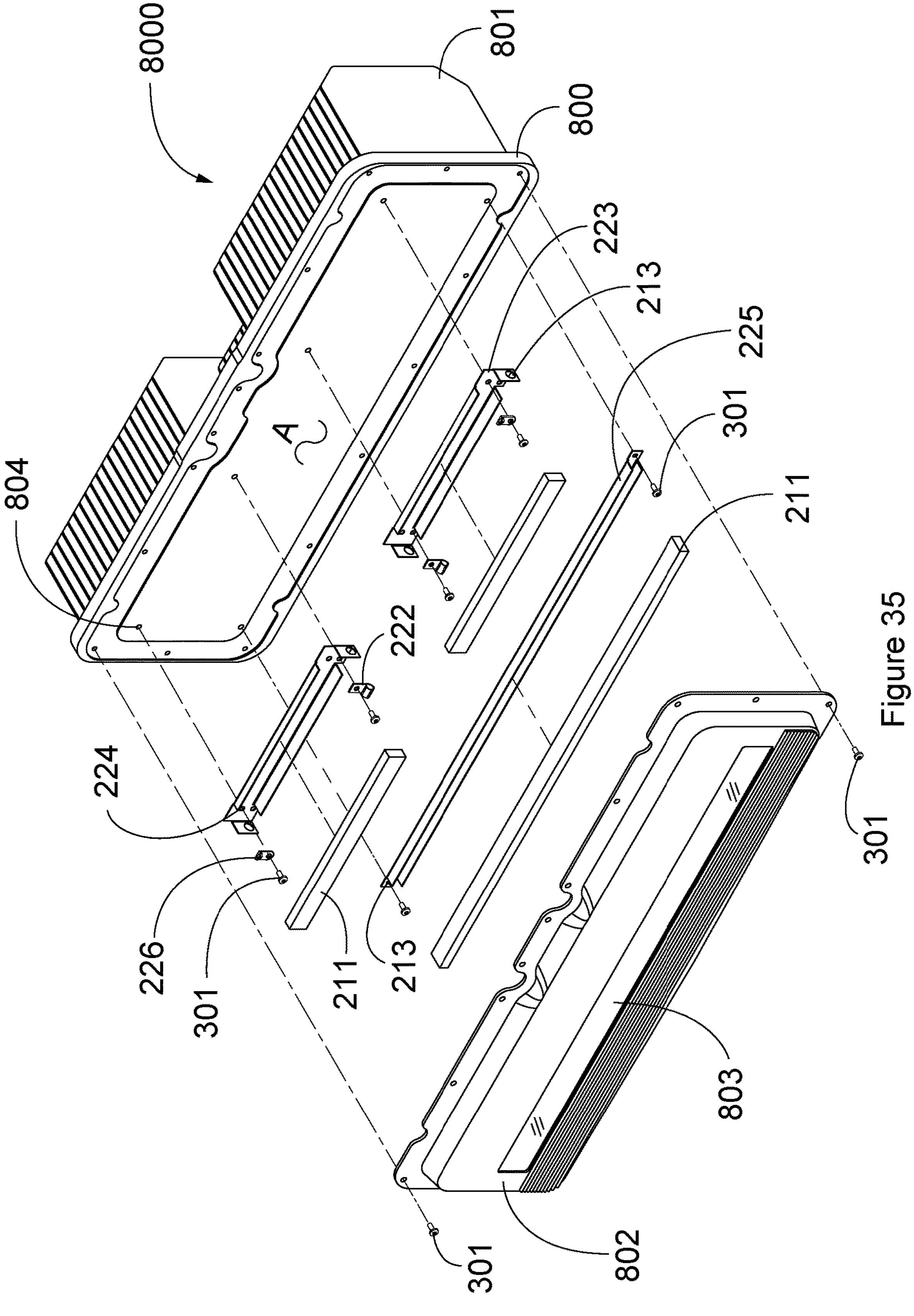
FIGS. 35 and 36 illustrate various views of the fixture of FIGS. 28-34 as modified according to aspects of the present invention; here an embodiment including a flexible carrier body with embedded desiccant with associated structure adapted to affix the desiccant in situ proximate one or more edges of an array of LED light sources of the lighting fixture.

9000 is mounted on the surface indicated at "A" on FIG. 35 prior to sealing part 802 with glass 803 against part 800 (e.g., with sealant and fastening devices). Compare the "lenses" of array 9000 to FIGS. 7-15, 19-20, 26-29, and 35-37 each of which illustrates a "glass" 103/203/803 which seals against an opening into a housing where LED light sources are contained. Said glass 103 or 203 or 803 is typically at least substantially light-transmissive. It might not substantially alter that light transmission or cause any substantial beam shaping from the light generated by the light source(s) and light directing and/or redirecting devices sealed in the fixture, but, under some conditions, might do either (e.g., if coated with an anti-reflective coating or might have a lens-like characteristic that directs or redirects light). Thus, use of the terms lens and glass should be taken in the context in which they are used. Other terms are used by way of convenience and are generally interchangeable: "water" or "moisture"; and "device", "feature", "structure", "part", "member", or "portion", for example.

With further regards to terminology, aspects of the present invention are directed to reducing gas or liquid phase moisture in LED lighting fixtures, at least in the sense it is disabled from availability to condense on the inside of fixture surfaces to a degree that it materially affects light fixture output or operation of components internal to the lighting fixture. It is important to note that, in one context, moisture is described as being absorbed by one or more desiccant materials; the terms "absorb" and "absorption" are used generically to indicate the taking in and holding of a gas or liquid (or vapor) regardless of normal operating conditions (e.g., if the interior temperature promotes evaporation), and no discussion is given herein regarding specific forms of absorption (e.g., solvent, osmotic, capillary, adsorption)—all of which are understood by those skilled in the art to be possible and envisioned under use of the general terms "absorb" and "absorption". Further, reduction of moisture can include moisture in liquid form (e.g., condensation) or in gas form (sometimes referred to as vapor in the industry)—and while water is specifically referenced, aspects of the present invention are not limited to such (e.g., other substances, mixtures, or mixtures with water with at least some analogous properties to water, including phase change between liquid and gas with temperature). Lastly, reduction of moisture does not necessarily mean complete removal of moisture. For example, at least some embodiments are designed such that desiccant is removable (e.g., when a desiccant material is fully saturated)—in this sense moisture is gathered by the desiccant over some time (though some is still technically existing in the internal space; e.g., in or on parts of the fixture or in the volume of air remaining inside the fixture), and then that moisture gathered and trapped by the desiccant is fully removed from the internal space. In other embodiments the desiccant is never removed and so technically the moisture always exists in the internal space but it is reduced in the sense that the volume gathered and trapped by the desiccant is not available for causing the adverse effects already described, even during conditions that risk causing undesirable moisture, including higher temperatures during light source operation at higher power levels. It should be appreciated that regardless of whether moisture gathered and trapped by the desiccant is fully removed from the lighting fixture or merely gathered and trapped at some point by the desiccant within the fixture but the desiccant is not removed, the goal is to reduce condensation which can negatively impact a lighting design by, e.g., reducing the portion of light that is useful—and that this can be achieved with permanent or removable means and methods, and regardless of where or how the moisture is absorbed. All of the aforementioned are possible, and envisioned, according to aspects of the present invention.

B. LED Lighting Fixture, Generally

The exemplary embodiments envision apparatus, methods, and systems of reducing moisture which gathers, forms, condenses, or otherwise exists on an interior surface of an LED lighting fixture under certain operating conditions. Generally speaking, LED lighting fixtures which exhibit condensation are operated outdoors and/or at elevated temperatures (e.g., due to a large number of LEDs and/or high operating current). Said lighting fixtures are typically elevated and angled downwardly towards a target area (e.g., at 30 degrees below horizontal with varying degrees of panning left and right). In this operational orientation, condensation or excess moisture is most likely to collect on the lower hemisphere of a fixture glass at the emitting face of the fixture because of gravity and the nature of a generally round fixture/emitting face. Of course, this could differ based on different operational orientations or with different styles/shapes of glass; compare, for example the shapes of glasses 103, 203, and 803. U.S. Patent Publication No. 2014/0092593—FIGS. 6A and FIGS. 13A-C of which are reproduced as FIGS. 17 and 18A-C herein—is incorporated by reference herein in its entirety and illustrates some possible operational orientations, styles/shapes of glass, and examples of LEDs, LED boards, light directing devices (e.g., secondary lenses), and light redirecting devices (e.g., visors) which may form an LED light source.

FIGS. 1-7 illustrate a generic LED lighting fixture 1000 as just described, which might exhibit condensation under some operating conditions. Fixture 1000 generally includes a thermally conductive substrate 100 which acts as the mounting surface for LEDs on one side (i.e., the side internal to the fixture), and which also acts as the mounting surface for one or more heat sink/radiating fins 101 on one side (i.e., the side generally opposite to the LED surface side and external to the fixture). An internal space in the fixture is defined by one side of substrate 100, inner surfaces of walls of a housing 102, and an inner surface of an emitting face glass 103 (also referred to as a glass cover) insomuch that it covers an open face of the lighting fixture. It is this internal space of the housing, and sealed with glass 103, which heats and cools, contains the LEDs and at least some associated light directing and/or light redirecting devices (see LED light source (also referred to as modules) 10 of FIGS. 17-18C), and is generally desired to be sealed (e.g., to prevent dirt accumulation), yet maintain an acceptable pressure via commercially available membrane vents 104 (e.g., any of the outdoor protective vents available from W.L. Gore & Associates, Inc., Newark, DE, USA).

Of course, in some cases, glass 103 forms a part of a larger assembly including at least a sealing device and lens ring designed so to be removable (see, e.g., U.S. Pat. No. 7,527,393 incorporated by reference herein). As an alternative approach, glass 203 or 803 forms a part of a larger assembly in which it is held in situ by mechanical devices internal to the lighting fixture (see device assembly 220, later discussed) in combination with fastening devices 301 external to the lighting fixture—which can be designed so to create a temporary or permanent seal (e.g., if combined with adhesive near glass edges). However, regardless of whether emitting face glass 103/203/803 is designed to be removable or the permanent seal must be broken to modify lighting fixtures already in the field, a method for reducing moisture in said LED lighting fixtures is as follows.

C. Exemplary Method

Figure 16:
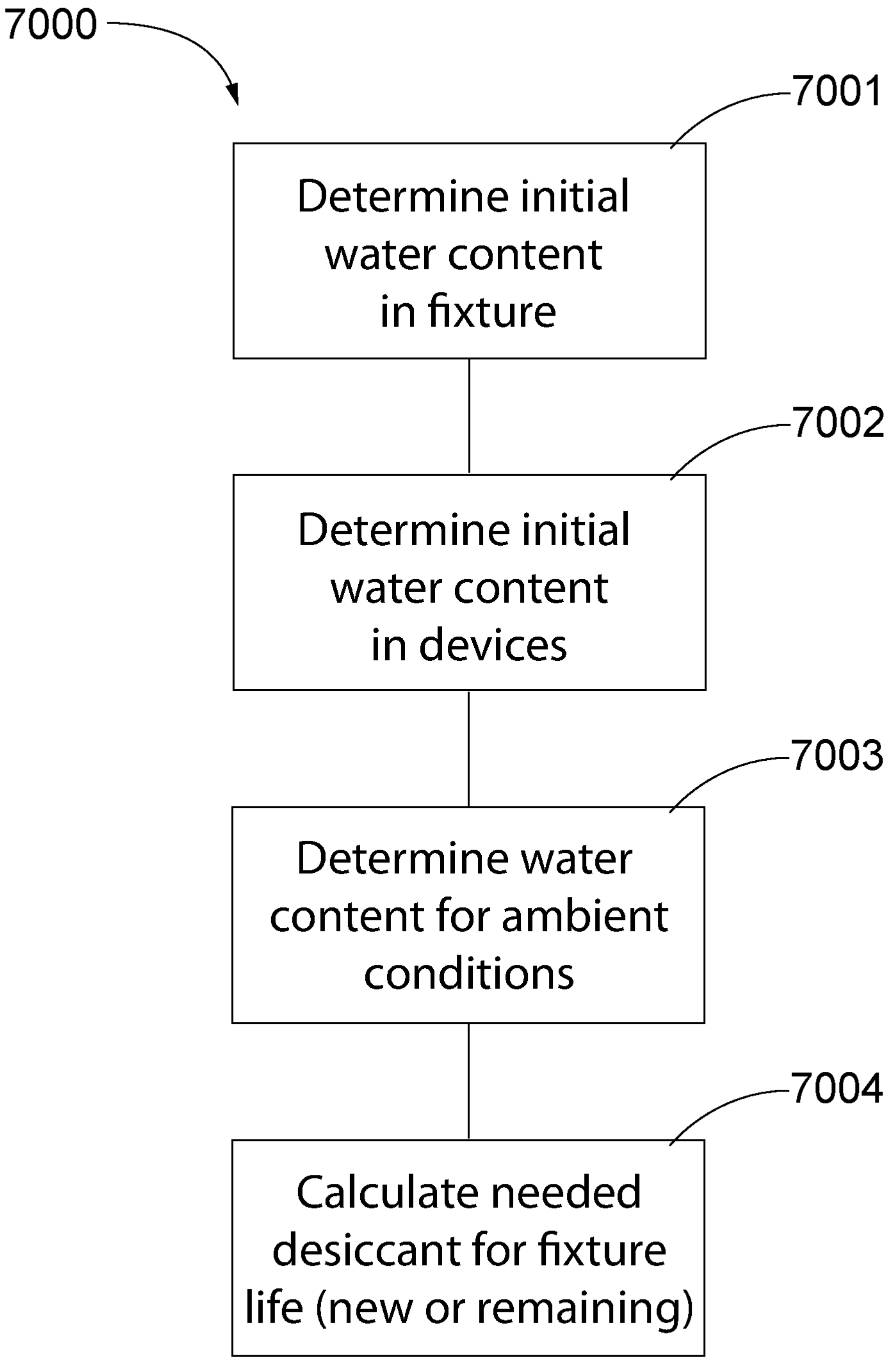
FIG. 16 illustrates one possible method of calculating a needed amount of desiccant to reduce moisture given anticipated ambient conditions, operating conditions, and/or lifespan of a lighting fixture having a defined internal space.

To reduce moisture over a predetermined period (e.g., over a normal operating life of a lighting fixture), the exemplary embodiments rely upon desiccant materials; different methods of installation, location of material (e.g., relative an internal space, emitting face, or LED light source of the lighting fixture), form (e.g., rigid particles alone or bagged, desiccant embedded in a flexible carrier body), and/or composition of desiccant (e.g., gel, molecular sieve), type of desiccant (e.g., clay, silica, calcium chloride), and/or the like are explored. Regardless, it can be important to first determine, predict, or estimate how much moisture is present (e.g., in the case of field repairs) or will likely be present over the life of a fixture (e.g., if designing for it in a factory setting); one possible method of doing such is illustrated in FIG. 16.

According to a first step 7001 of method 7000, the initial water content in the fixture is determined. Step 7001 requires some basic knowledge of relative humidity and temperature when the lighting fixture was first assembled/sealed to understand how much water is present in a defined internal space—this knowledge should be readily known by the manufacturer of the fixture, but could also be estimated. For example, assuming an internal fixture space volume of approximately 1400 cubic inches, and fixture sealing at approximately 25° C. and 60% relative humidity, yields an anticipated water weight of approximately 0.4 grams in the volume of air of the internal space. However, as discussed earlier, this is not the entirety of moisture which may be present in the internal space. For example, some moisture whether in liquid, solid, or gas phase may not be gathered and trapped by the desiccant. But it is important to understand that any gathering and trapping by the desiccant can have beneficial effects. Some of the remaining moisture may not, as a practical matter, be gathered and trapped by desiccant. But, again, one can estimate or predict even roughly the amount of moisture using the above or similar techniques, and can select type, amount, characteristics and placement of desiccant within a given fixture based on that estimate to promote the benefits of gathering and trapping at least some of what otherwise might result in the moisture producing undesirable optical effects.

Figure 17:
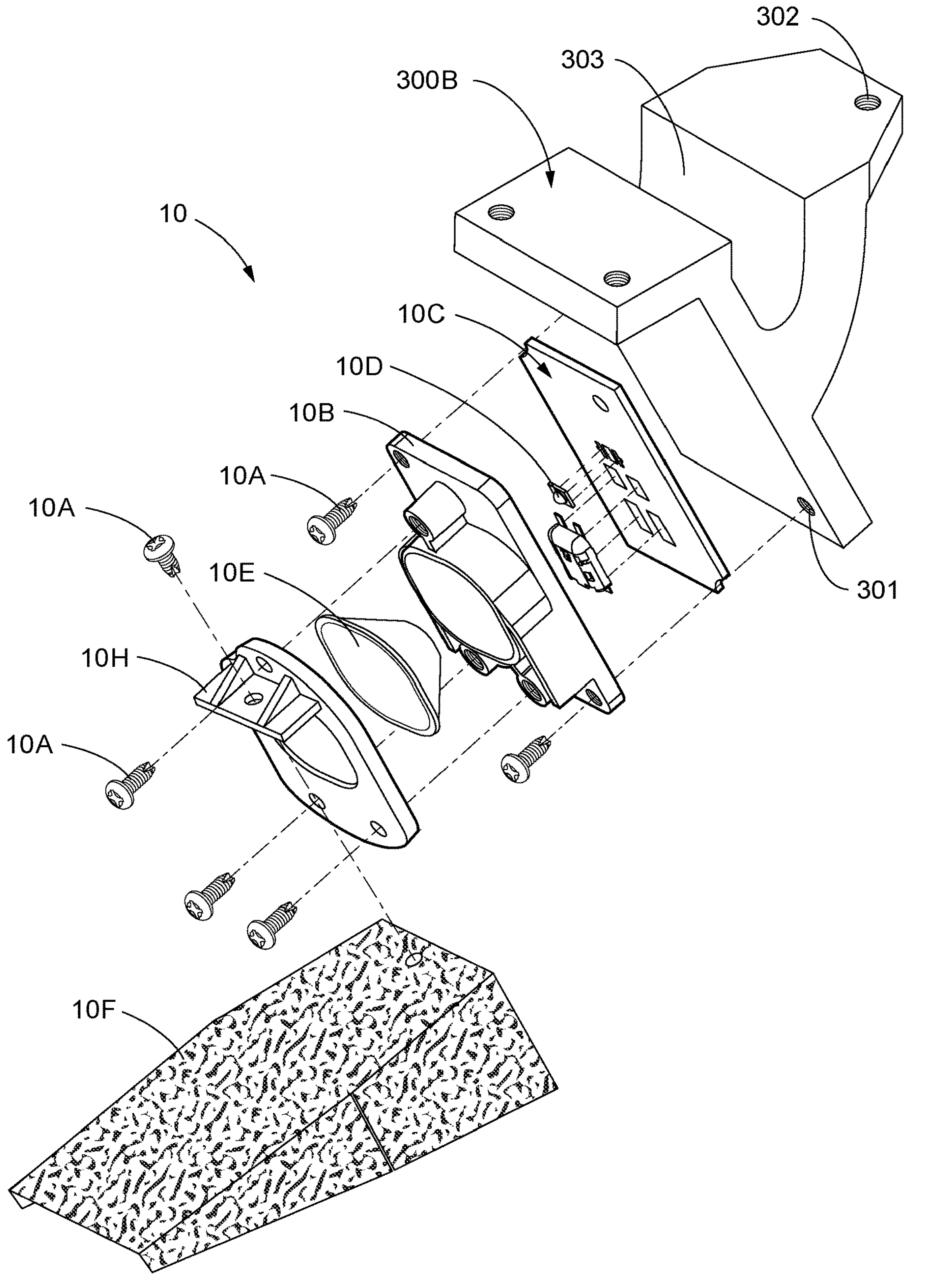
FIGS. 17 and 18A-C are FIGS. 6A and FIGS. 13A-C, respectively, of incorporated U.S. Patent Publication No. 2014/0092593 and illustrate non-limiting examples of such things as, inter alia, LED light sources, mounts, and orientations inside a fixture, a glass cover that can seal the internal space of the fixture, light directing and light redirecting devices, which are capable individually or in any combination to be used in any of the exemplary embodiments described herein.

A second step 7002 comprises determining, predicting, or estimating the water content in any light directing and/or light redirecting devices themselves (e.g., secondary lenses, holders for secondary lenses); see, for example, FIG. 17 for an example of a single holder comprising pieces 10B and 10H, single light directing device (secondary lens 10E), and single light redirecting device (visor 10F), and FIG. 36 which illustrates an array 9000 of holders and secondary lenses. It has been found that silicone secondary lenses are more hygroscopic than acrylic, for example, and therefore, retain more moisture. Therefore, baking/burnout (or other applications of heat) procedures well known to those skilled in the art to disassociate moisture from conventional secondary lenses may not be suitable to fully remove moisture from silicone secondary lenses, for example. Thus, it may not be practically possible to remove all such retained moisture inside the fixture. But, according to aspects of the invention, the exemplary embodiments are beneficial to address at least some interior moisture for the benefits discussed herein. Also, some of the retained moisture in hygroscopic materials, like the moisture gathered and trapped by desiccant, may stay absorbed even during high temperature operating conditions of the fixture, and thus not affect the optical properties of the fixture. Further, moisture can be introduced into the system over time (which is later discussed)—in particular, in outdoor or non-hermetic/environmentally controlled environments—and so understanding absorption with respect to the light directing devices and light redirecting devices is a critical step. As such, in accordance with step 7002, light directing and/or light redirecting devices in the internal space may be fully saturated, weighed, moisture removed according to standard baking/burnout procedures, weighed, and the difference in weight assumed to be a minimum water weight retained by the devices. For the specific scenario of approximately 1400 cubic inches of internal fixture space utilizing two-hundred twenty-eight silicone secondary lenses with associated holders, a water weight of approximately 6.5 grams associated with the secondary lenses/holders is reasonable. Similar or analogous techniques can be used for this purpose, and for other parts or materials that have or might have retained water or moisture.

To this point there are two water weights in consideration—that in the air in the fixture, and that associated with the light directing and/or light redirecting devices. According to step 7003 (which is relevant primarily for outdoor and/or non-hermetic environments), water content associated with ambient and operating conditions may be assessed. Typically, LED lighting fixtures used in said outdoor and specialty lighting applications are cycled on and off many times, in every season, for many years. As such, according to step 7003, it is beneficial to look at the ambient conditions in which the lighting fixture will operate—for example, average ambient temperatures and humidity levels, as well as anticipated fixture temperature during operation and number of operating hours—to get an idea of water content. As previously stated, sealed LED lighting fixtures are often equipped with a commercially available membrane vent (e.g. 104 or 204) to maintain adequate pressure, so there is a repeated and regular exchange of air within the fixture (and the moisture it carries) and air outside the fixture (and the moisture it carries). In practice, calculations according to step 7003 will vary greatly depending on operating hours and geographic area, for example, but assuming a lifespan of 10 years and around 50 power-on cycles per year (i.e., where fixtures are fully lit and heat up, and then are turned off and fully cool down), 315 power-off cycles per year (because moisture is being introduced into the system even when LEDs are not in operation, albeit at a different rate), in an average outdoor environment (e.g., a non-powered fixture temperature never more than 40° C. above or below ambient), it is not unreasonable to assume the lighting fixture having the aforementioned internal space would take on approximately 45 grams of water over its lifespan.

Having in hand the anticipated water content from steps 7001, 7002, and 7003, according to step 7004 a total water capacity needed from a desiccant material may be determined. Different desiccants have different weights, different capacities for absorbing moisture, and different material properties (e.g., some may be corrosive or otherwise unsuitable for use near LED boards)—all of the aforementioned factor in determining a quantity and type of desiccant according to step 7004. Such information is typically available from desiccant manufacturers, but could be obtained by empirical testing. It is not unreasonable to assume a lighting fixture of the aforementioned characteristics may require a desiccant quantity on the order of 250 grams (assuming 20% water absorption by weight for the desiccant) to absorb an adequate amount of moisture to avoid condensation over the life of the fixture (here, 10 years for a new fixture). If a field repair situation, method 7000 as just described could be modified as needed to address a portion of operating life (e.g., lifespan calculations or estimations based on 1 year of remaining life, for example). And, of course, as new desiccant materials are developed with greater capacity for water absorption (e.g., 40%), a smaller quantity (e.g., 100 grams) may only be needed.

As will be appreciated, the forgoing calculations can be estimates based on the indicated factors. It is not necessarily required they be made with any high precision or accuracy. Such calculations/estimates can be rough and be effective for the purposes herein. One can use techniques, such as are deemed practical, to optimize such calculations/estimates. One can also take the calculation/estimate and, as might be practical, over-design the capacity of the desiccant to have higher confidence that it will be reasonably effective for all foreseeable conditions for a selected amount of time and operation, whether the full expected effective life of the fixture or some fraction thereof.

D. Exemplary Apparatus Embodiment 1

Figure 8:
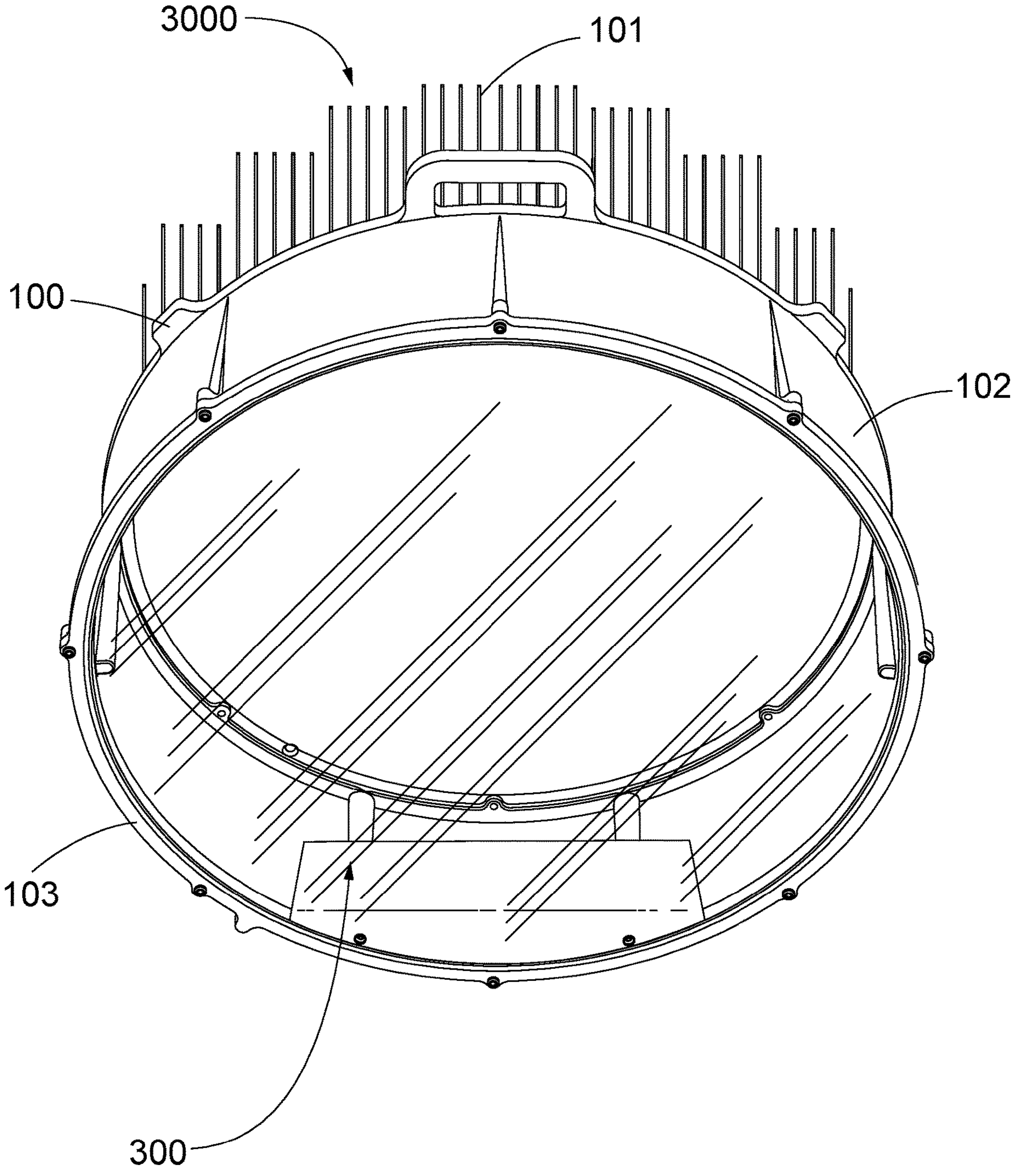
FIGS. 8 and 9 illustrate various views of the fixture of FIGS. 1-7 as modified according to aspects of the present invention; here a first embodiment including an interior bagged desiccant in whatever form (e.g., a plurality of relatively small particles, larger collective masses, etc.) with associated structure in the lower hemisphere of the lighting fixture.
Figure 9:
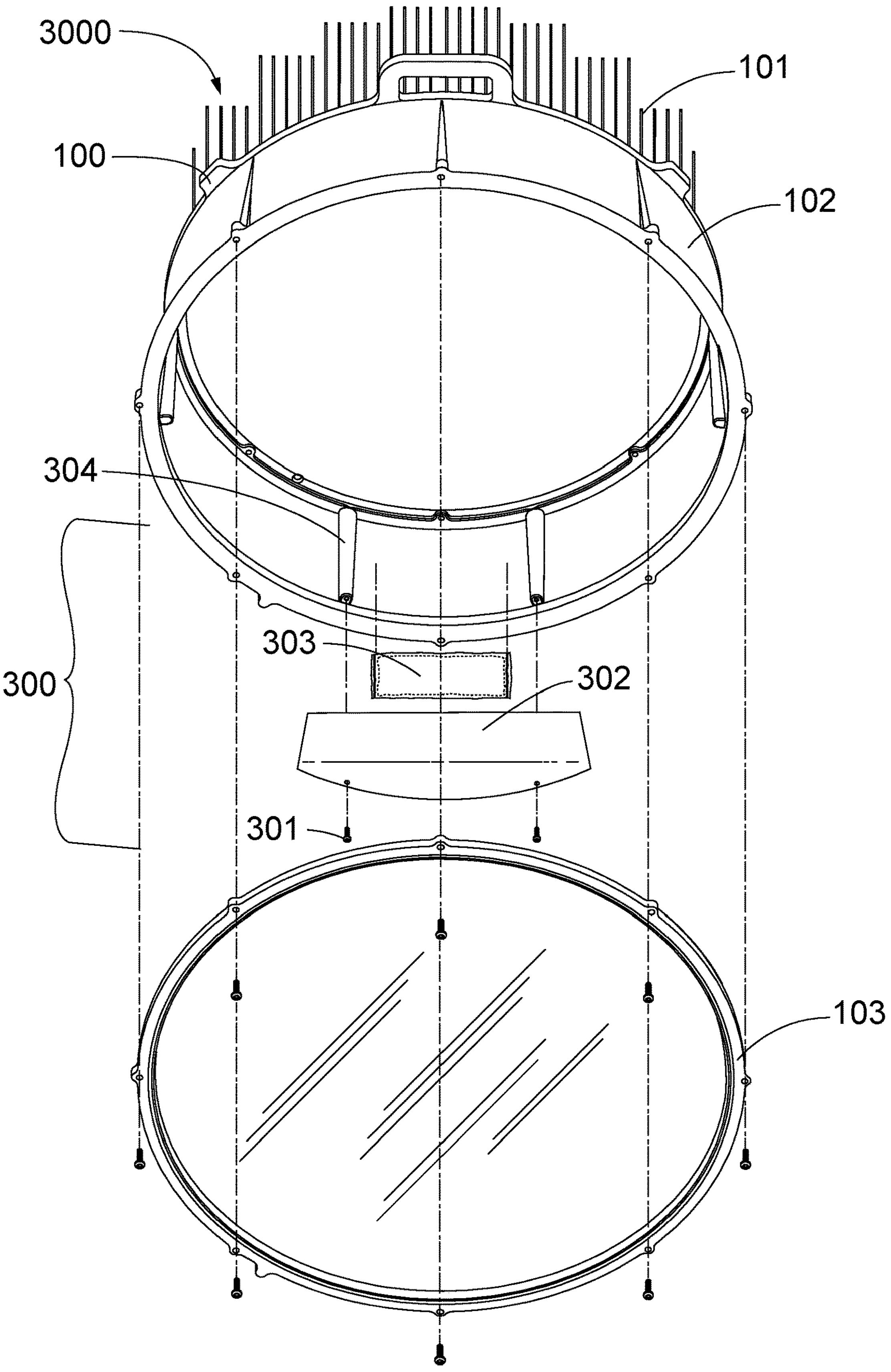
Figure 18C:
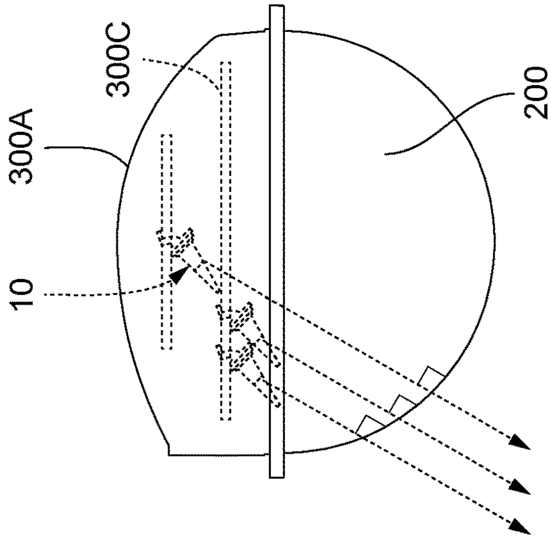
Figure 18B:
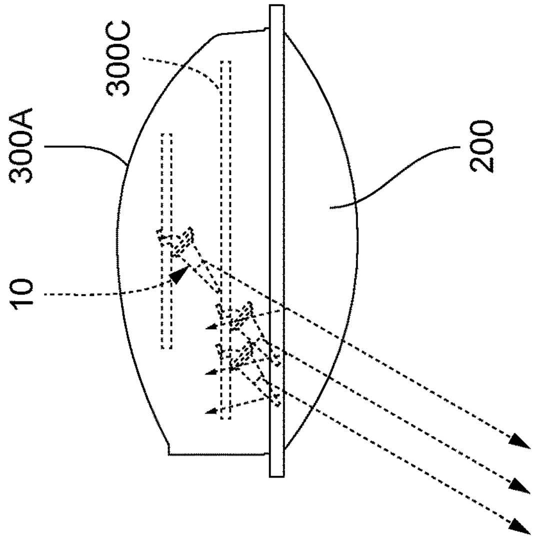
Figure 18A:
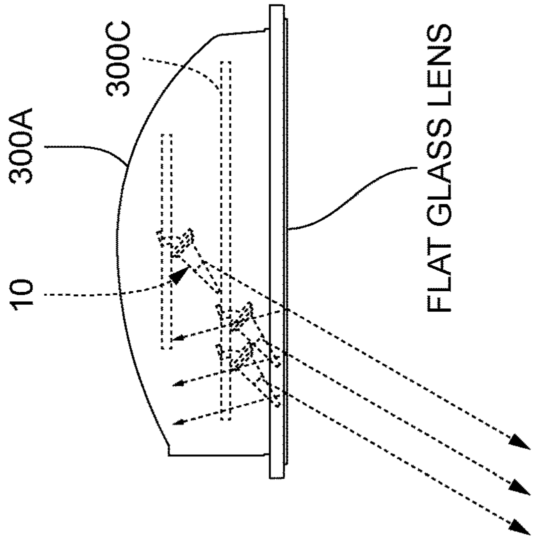
Figure 19:
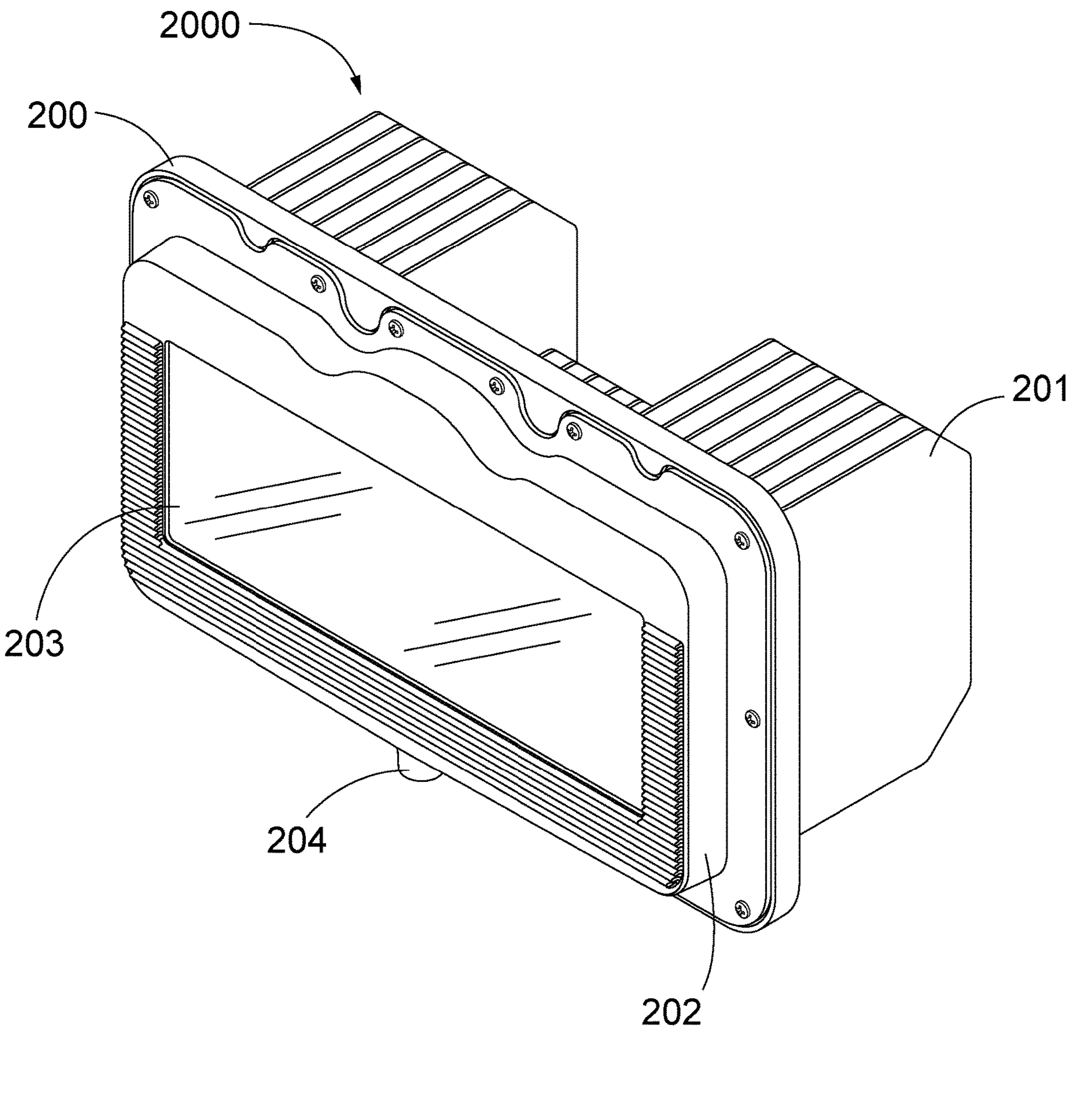
FIGS. 19-25 illustrate various views of an alternative design of an outdoor and/or specialty LED lighting fixture which might experience condensation under at least some operating conditions; note that FIGS. 19-25 do not illustrate the lighting fixture in any particular operational orientation/aiming.
Figure 20:
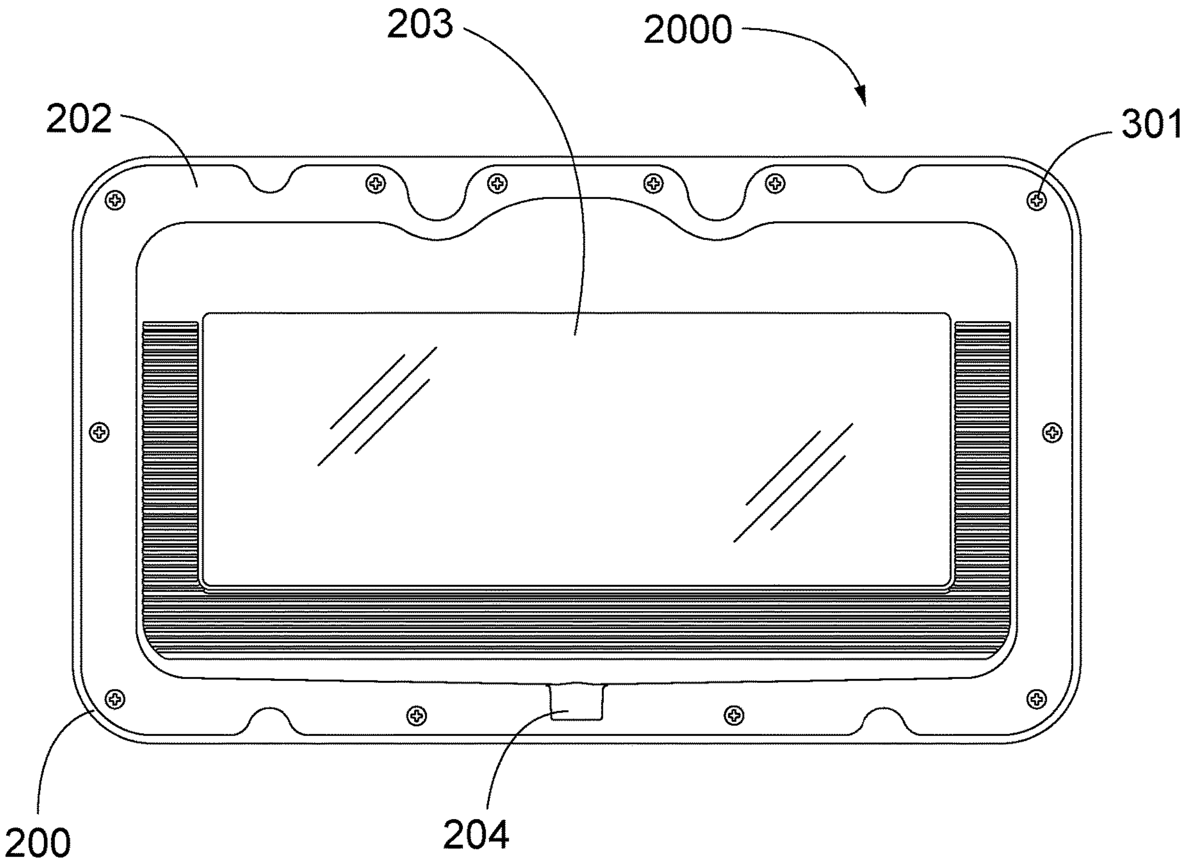
Figure 21:
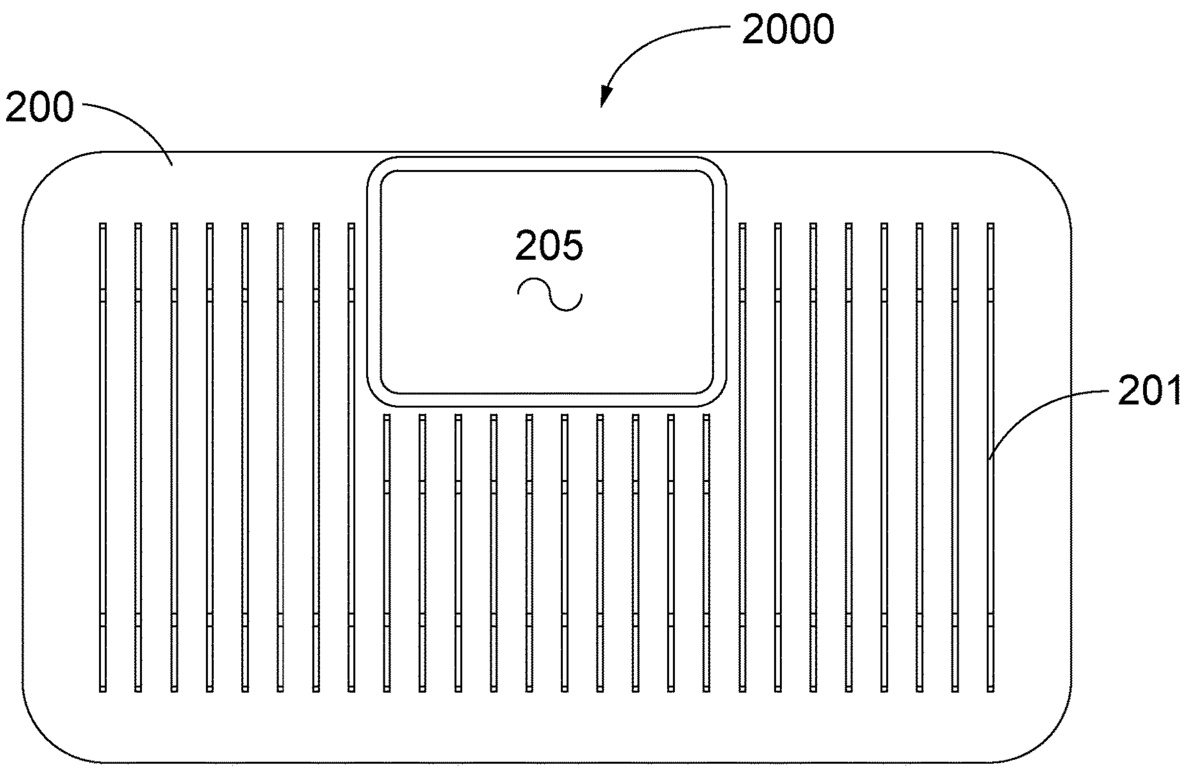
Figure 22:
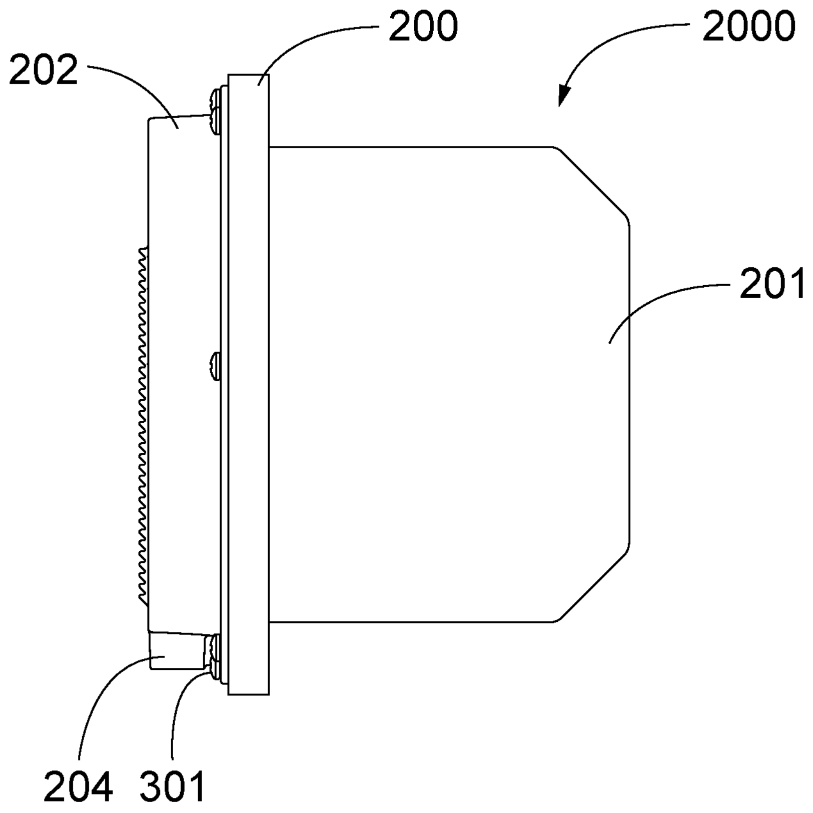
Figure 23:
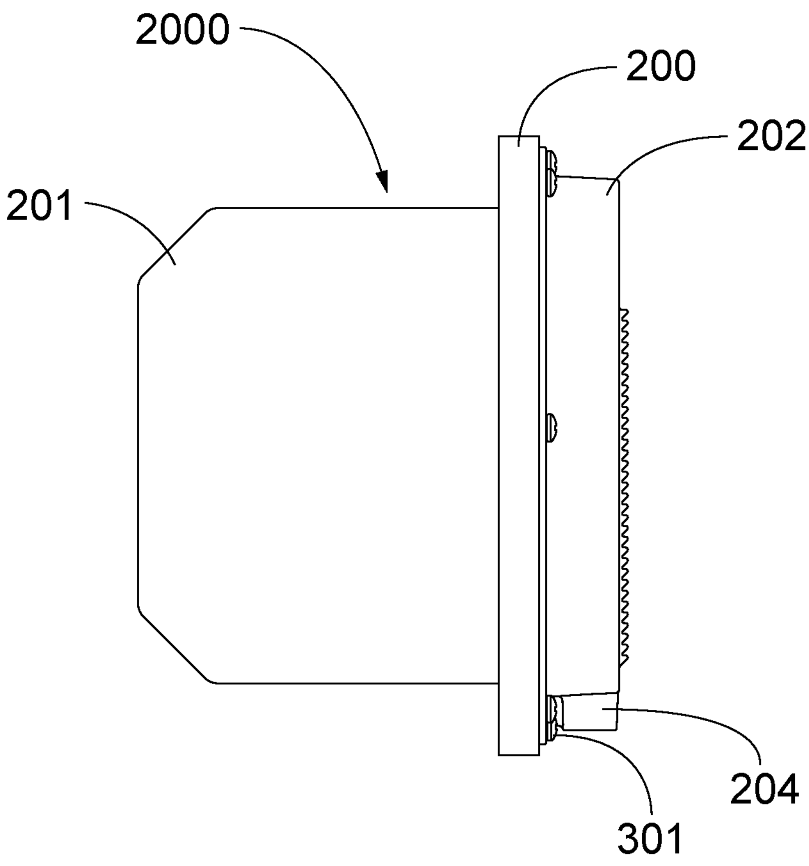
Figure 24:
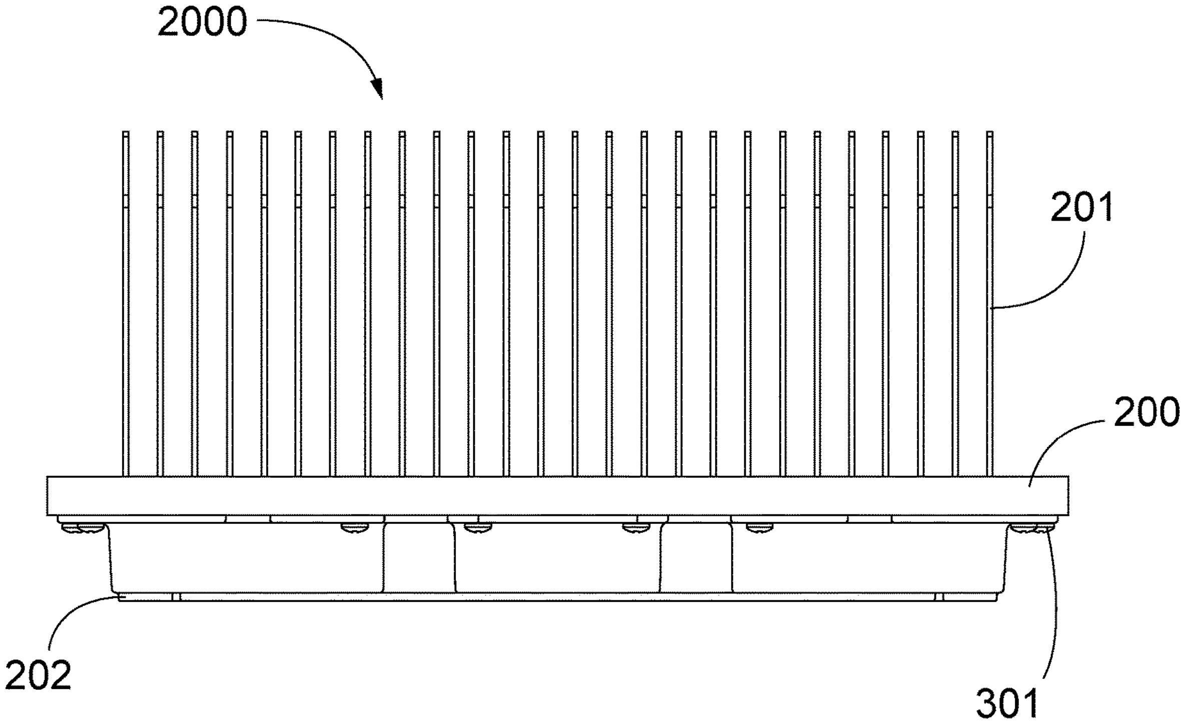
Figure 25:
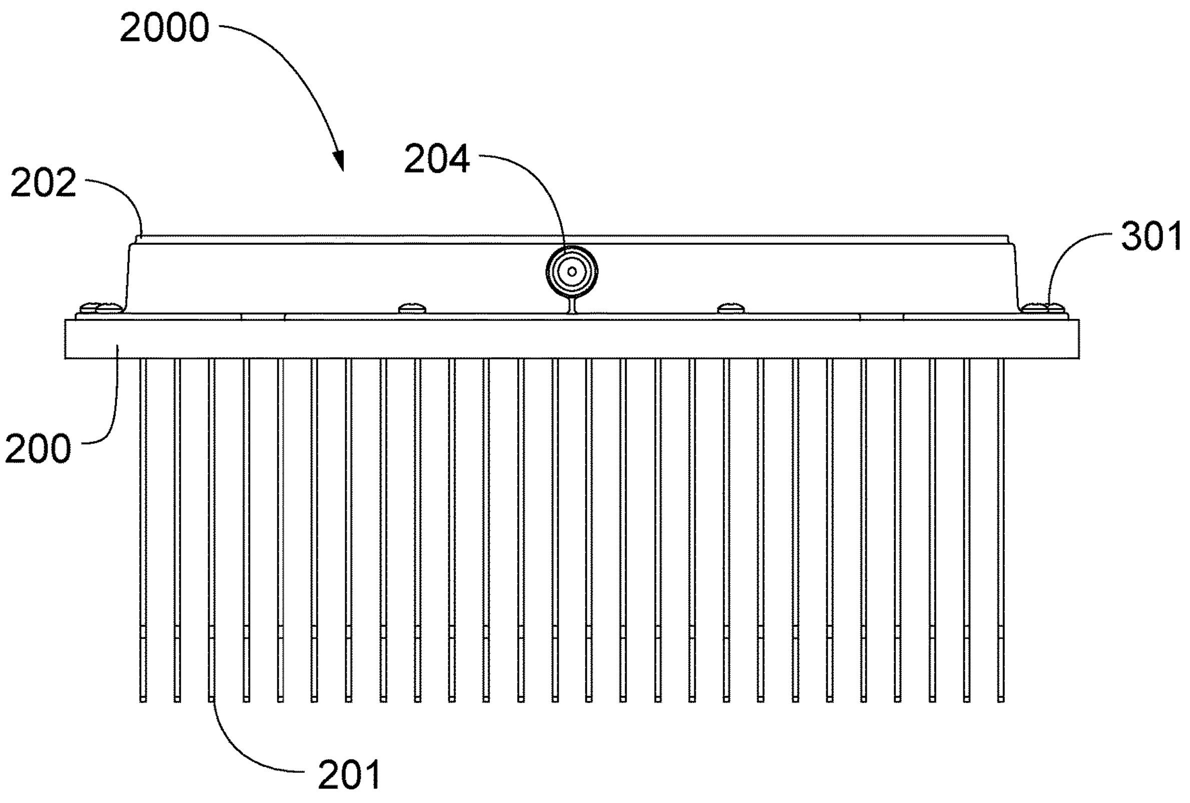

FIGS. 8 and 9 illustrate a first embodiment; note that for clarity no LEDs, LED boards, light directing and/or light redirecting devices, or electrical connections are illustrated (see FIGS. 17-18C for examples of at least some of the aforementioned). Here, a desiccant material 303 of assembly 300 is inserted into housing 102 of fixture 3000, and held in place via fastening devices 301 extending through a hold-down plate 302 and into complementary portions 304 of housing 102. Here, desiccant material 303 is encased or contained in at least a gas permeable bag (it could be at least partially liquid permeable) so long as the material retains the desiccant. Such bag material can be the same or similar to that used in any of the wide variety of bagged desiccants that are put in packaging of products to absorb moisture. The material of the bag should allow sufficient transfer of moisture to the desiccant to be effective for the purposes described herein.

Primary benefits of the present embodiment are such that (i) since assembly 300 is physically near the site of condensation in the lower hemisphere of the internal space of the fixture, moisture is rapidly collected and removed from interior emitting face of glass 103, and (ii) the present approach can be readily implemented in a factory setting and therefore an amount/type/capacity of desiccant can be selected such that field repairs are never needed during an anticipated fixture lifespan. That being said, the present embodiment (i) does require breaking a seal at glass 103/housing 102 (which is often intended to be a permanent seal) in a field repair situation, (ii) can be difficult to install in a field repair situation if feature 304 (or similar structure) is not available, and (iii) depending on the optical characteristics of part 302, could impact transmission of light from inside the fixture to outside the fixture to the target area so to reduce useful light.

E. Exemplary Apparatus Embodiment 2

Figure 10:
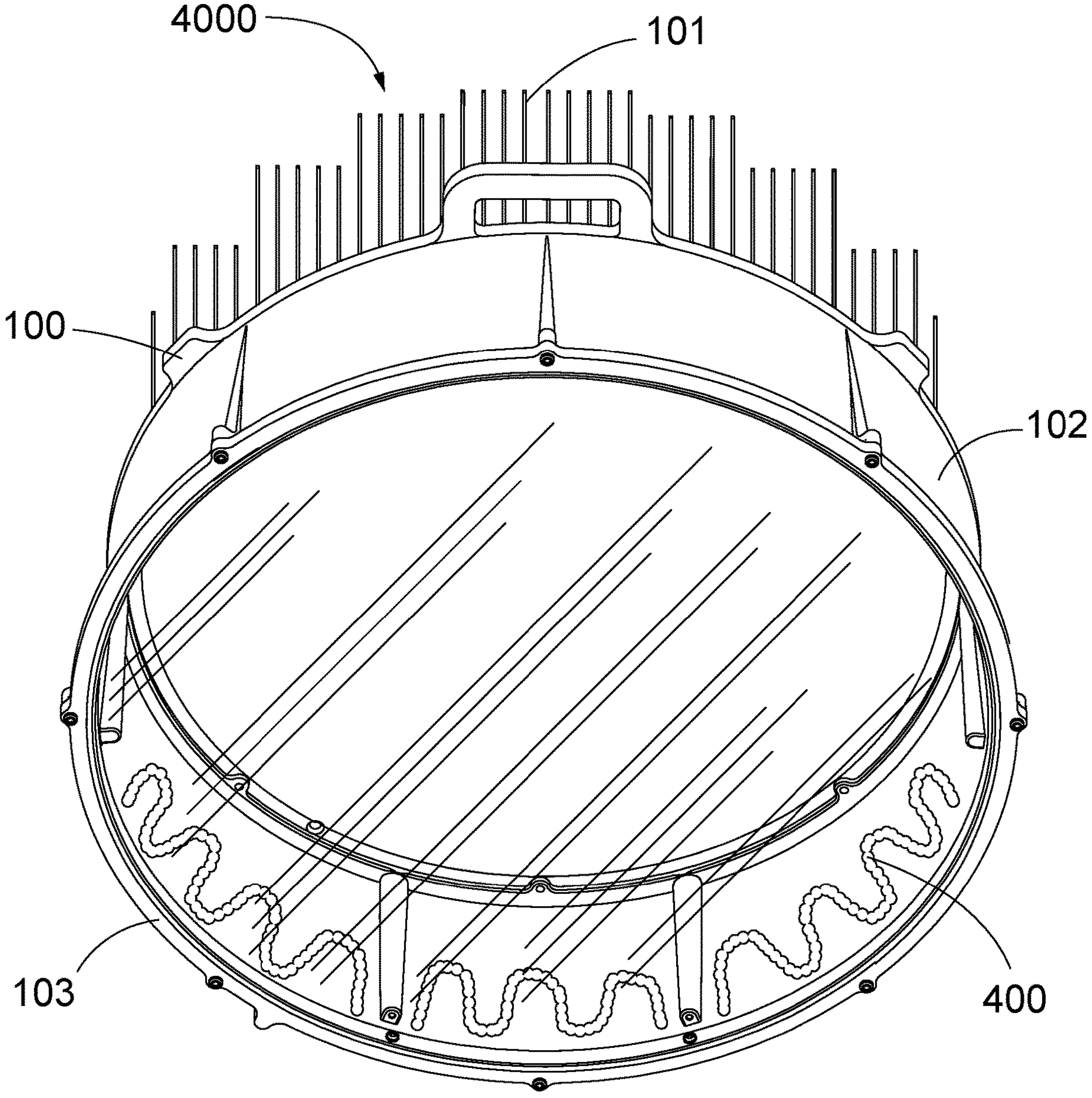
FIGS. 10 and 11 illustrate various views of the fixture of FIGS. 1-7 as modified according to aspects of the present invention; here a second embodiment including an interior moldable desiccant (e.g., a manually malleable or plastic volume or mass) in the lower hemisphere of the lighting fixture.
Figure 11:
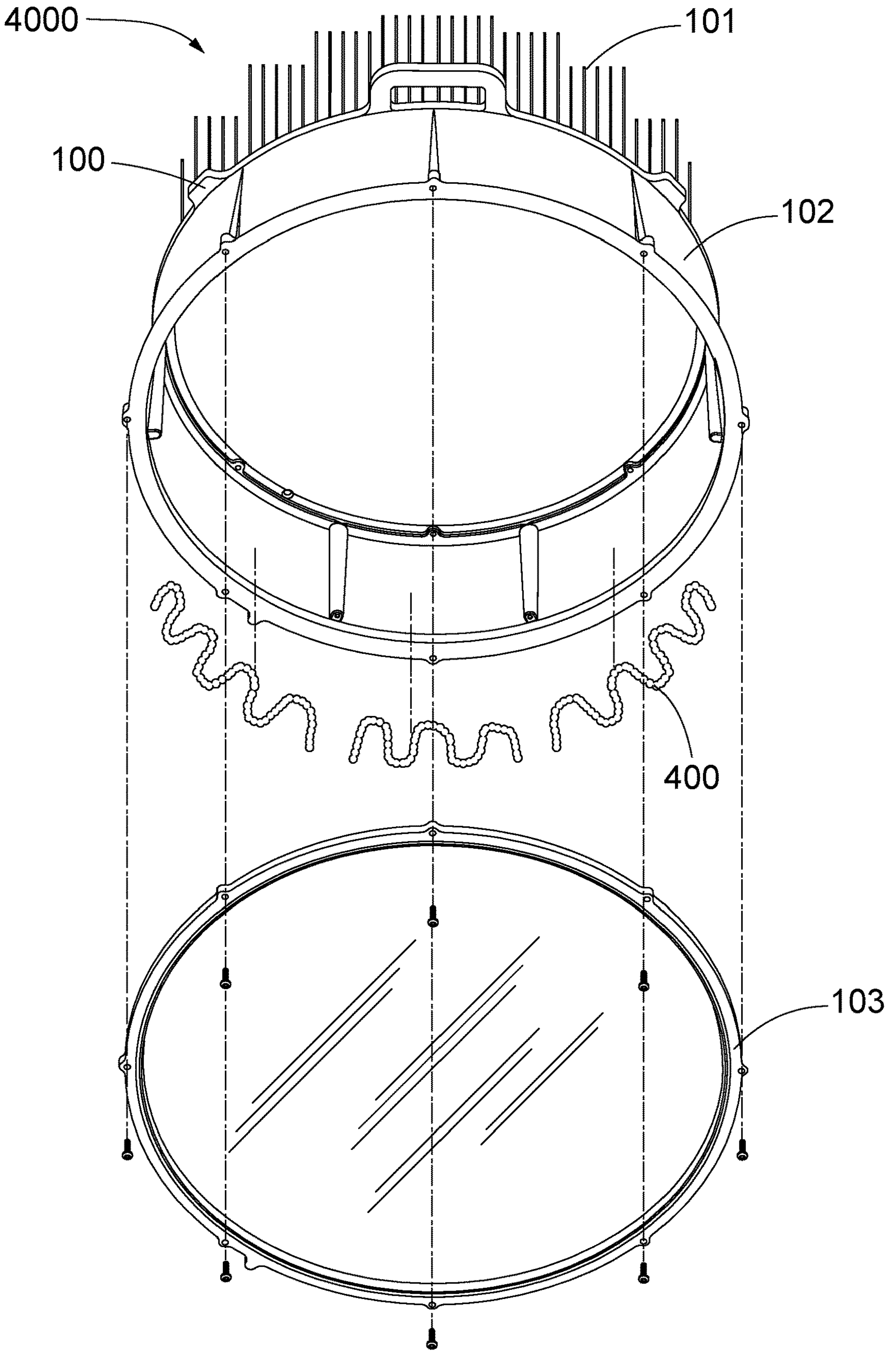

FIGS. 10 and 11 illustrate a second embodiment; note that for clarity no LEDs, LED boards, light directing and/or light redirecting devices, or electrical connections are illustrated (see FIGS. 17-18C for examples of at least some of the aforementioned). Here, a desiccant material 400 is piped into, foamed, or otherwise formed in place in some portion of the lower hemisphere of the internal space of fixture 4000. In practice, any of a variety of moldable desiccants could be used; for example, those available from DryTech, Inc., Cookstown, NJ, USA.

Primary benefits of the present embodiment are such that (i) since desiccant 400 is physically near the site of condensation in the lower hemisphere of the internal space of the fixture, moisture is rapidly collected and removed from interior emitting face of glass 103, and (ii) the present approach can be readily implemented in a factory setting and therefore an amount/type/capacity of desiccant can be selected such that field repairs are never needed during an anticipated fixture lifespan. That being said, the present embodiment (i) might require breaking a seal at glass 103/housing 102 in a field repair situation (unless, for example, it can be piped into an existing aperture (e.g., from a removed or modified membrane vent)), and (ii) moldable desiccant may be more expensive or more difficult to apply in situ than in other exemplary embodiments.

F. Exemplary Apparatus Embodiment 3

Figure 12:
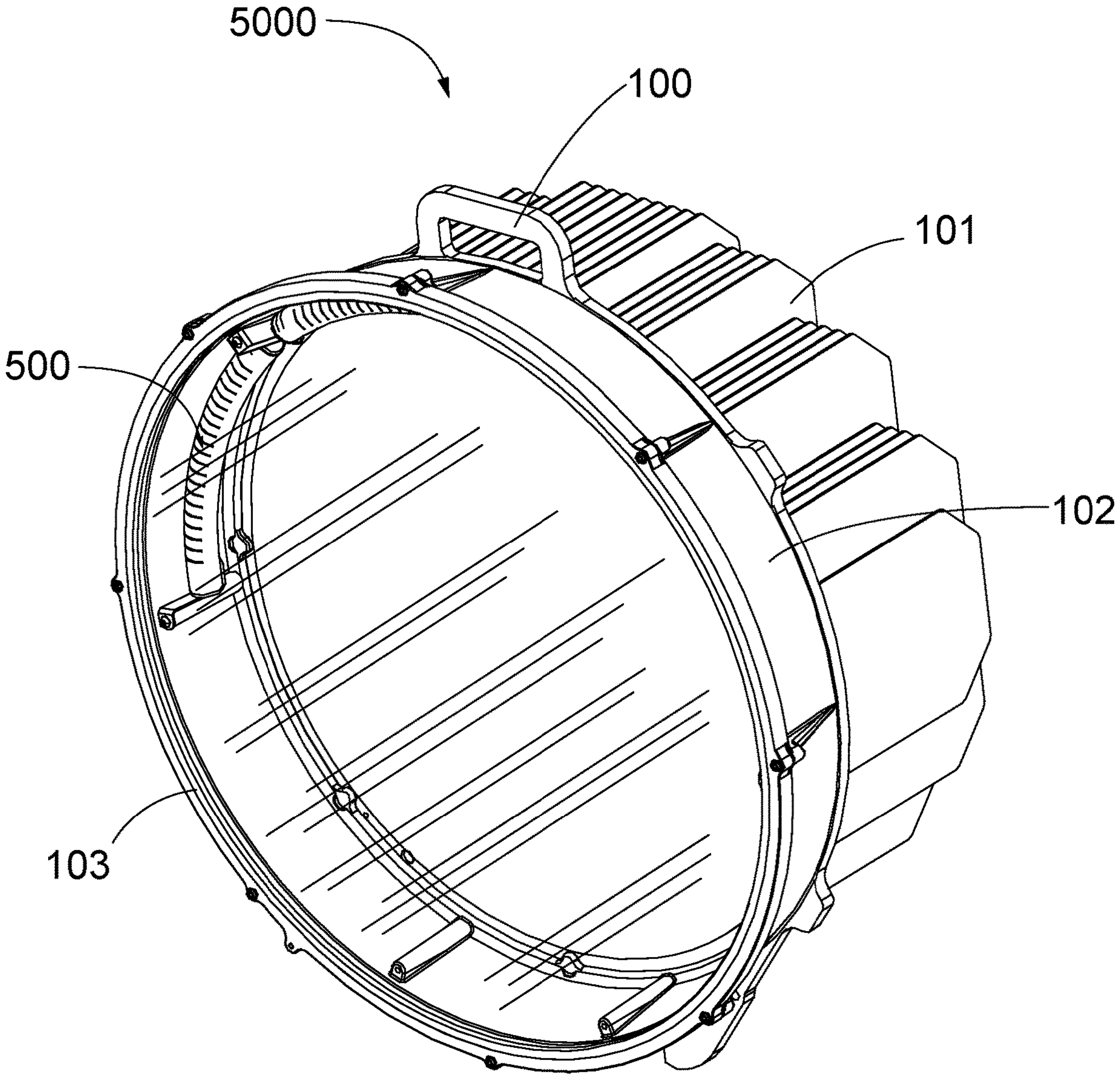
FIGS. 12 and 13 illustrate various views of the fixture of FIGS. 1-7 as modified according to aspects of the present invention; here a third embodiment including an interior loose desiccant (e.g., plurality of relatively small particles) in the upper hemisphere of the fixture.
Figure 13:
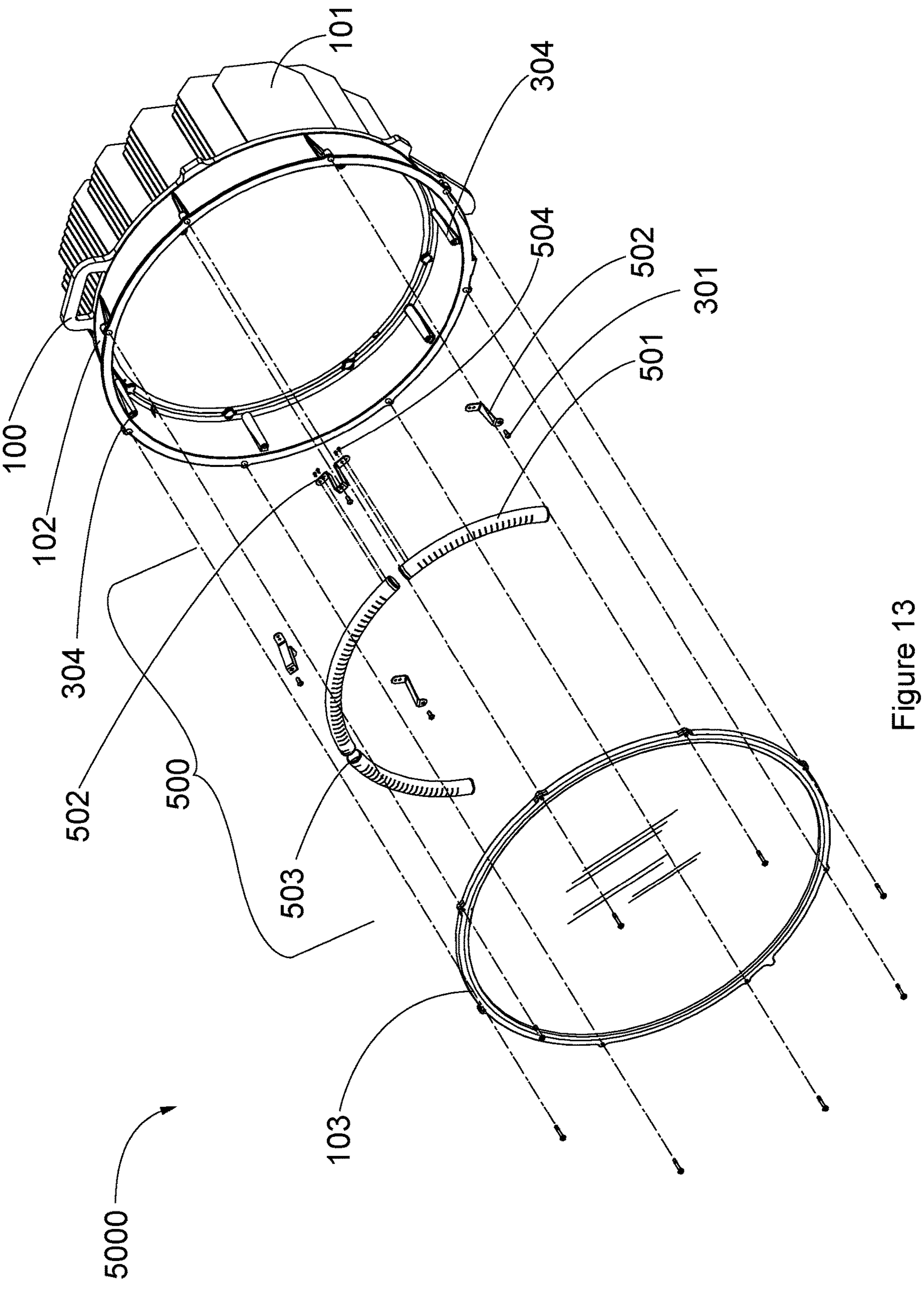

FIGS. 12 and 13 illustrate a third embodiment; note that for clarity no LEDs, LED boards, light directing and/or light redirecting devices, electrical connections, or desiccant are illustrated (see FIGS. 17-18C for examples of at least some of the aforementioned). Here, a loose desiccant material (not shown) of assembly 500 is poured into a perforated aluminum alloy tube 501 within the internal space of fixture 5000. As can be seen, perforated tube 501 exists in sections, each section closed at opposite ends by a cap 503 once desiccant is inserted, the desiccant having a particle size larger than the perforations so to avoid spilling out (e.g., 2-4 mm diameter silica gel beads available from Dry & Dry, Brea, CA, USA). One possible means of affixing tubes 501 in situ is to rely upon existing portions 304 of housing 102 by affixing a first portion of a bracket 502 to said portion 304 (e.g., via fastening device 301), and securing (e.g., via rivets 504) a tube section 501 to a second portion of said bracket 502 (note two styles of bracket 502 are illustrated in FIG. 13).

Primary benefits of the present embodiment are such that (i) because assembly 500 is located in the upper hemisphere of the lighting fixture it is not likely useful light will be impacted, and (ii) the present approach can be readily implemented in a factory setting and therefore an amount/type/capacity of desiccant can be selected such that field repairs are never needed during an anticipated fixture lifespan. That being said, the present embodiment is difficult to machine and therefore difficult to mass produce; however, it might be useful in a field repair situation if the tubes could be fed into an existing aperture (e.g., from a removed or modified membrane vent) and secured in situ (whether in the manner just described or otherwise).

G. Exemplary Apparatus Embodiment 4

Figure 14:
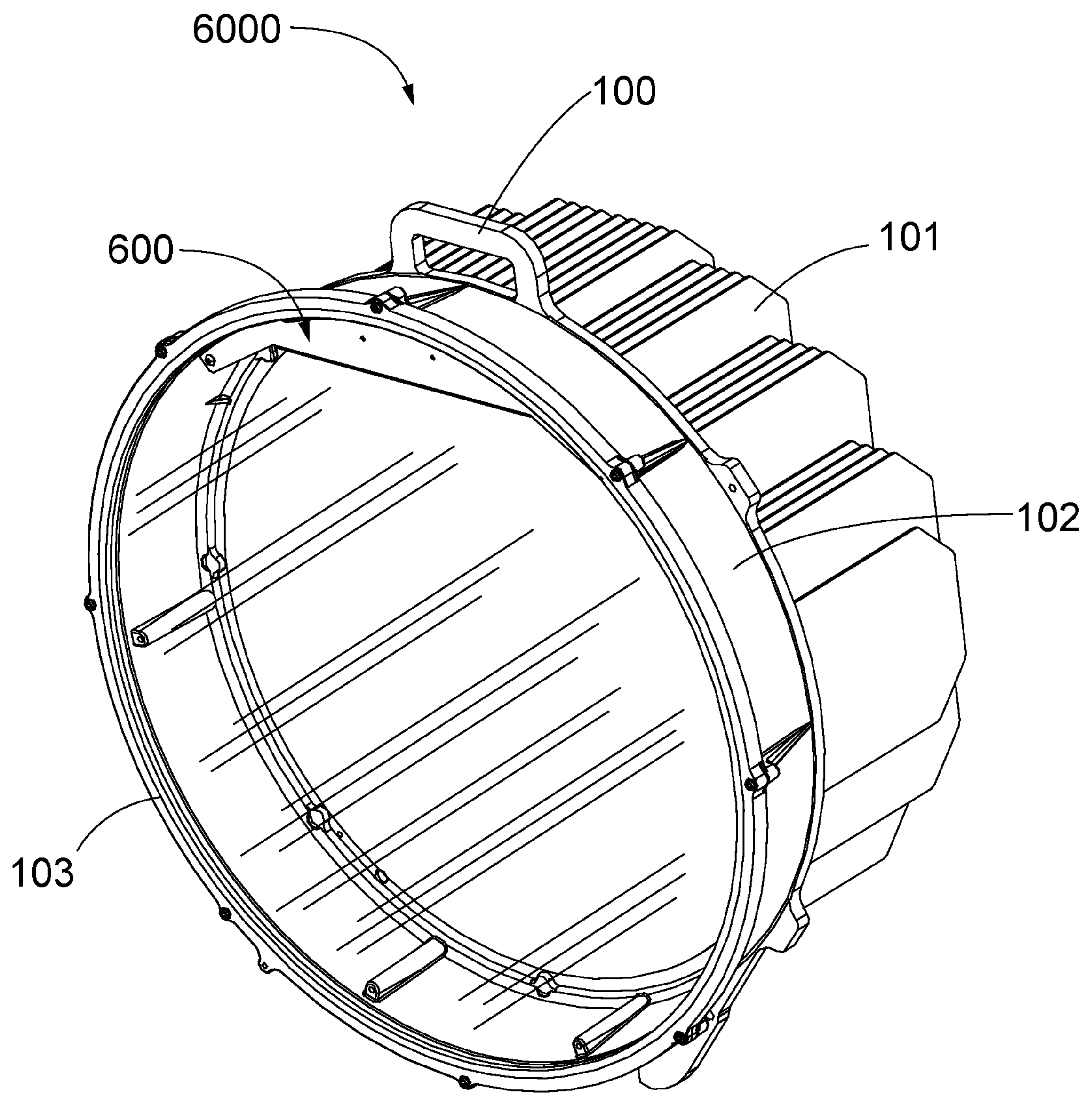
FIGS. 14 and 15 illustrate various views of the fixture of FIGS. 1-7 as modified according to aspects of the present invention; here a fourth embodiment including an interior loose or bagged desiccant in the upper hemisphere of the fixture.
Figure 15:
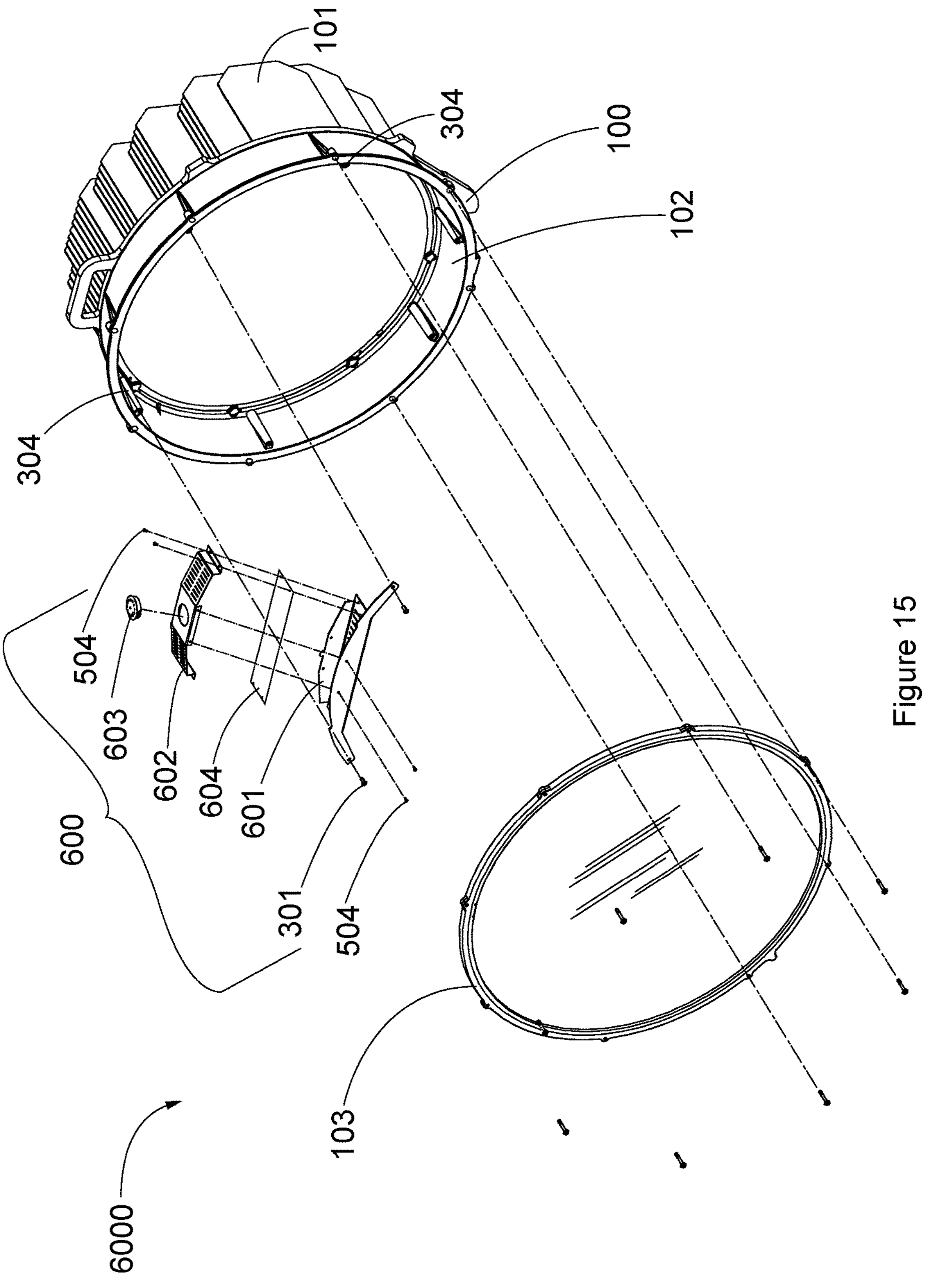

FIGS. 14 and 15 illustrate a fourth embodiment; note that for clarity no LEDs, LED boards, light directing and/or light redirecting devices, electrical connections, or desiccant are illustrated (see FIGS. 17-18C for examples of at least some of the aforementioned). Here, a loose desiccant material of assembly 600 is poured into an aperture of a first perforated anodized sheet metal cartridge portion 602 which is affixed (e.g., via rivets 504) to a second perforated anodized sheet metal cartridge portion 601. After a sufficient amount of desiccant is inserted into the space defined by parts 602/601—the desiccant having a particle size larger than the perforations so to avoid spilling out (e.g., said silica gel beads) and/or including a filter 604 (e.g., polyester or other fabric able to function at high temperatures)—said aperture is closed with a cap 603. Assembly 600 is affixed to some feature (e.g., existing portion 304 by fasteners 301) in the upper hemisphere of the internal space of fixture 6000.

Primary benefits of the present embodiment are such that (i) because assembly 600 is located in the upper hemisphere of the lighting fixture it is not likely useful light will be impacted, and (ii) the present approach can be readily implemented in a factory setting and therefore an amount/type/capacity of desiccant can be selected such that field repairs are never needed during an anticipated fixture lifespan. That being said, the present embodiment requires more material and machining than other embodiments set forth.

H. Exemplary Apparatus Embodiment

FIGS. 19-25 illustrate an alternative design of an outdoor and/or specialty LED lighting fixture which might experience condensation under at least some operating conditions; here a square, rectangular, or otherwise shaped lighting fixture which has angular features where moisture may condense (as opposed to round-like features with defined curvature/hemispheres as in Embodiments 1-4). However, like previous embodiments, fixture 2000 includes a thermally conductive substrate 200 which acts as the mounting surface for LEDs on one side (i.e., the side internal to the fixture), and which also acts as the mounting surface for one or more heat sink/radiating fins 201 on one side (i.e., the side generally opposite to the LED surface side and external to the fixture). Further, fixture 2000 includes an internal space defined by one side of substrate 200, inner surfaces of walls of a housing 202, and an inner surface of an emitting face glass 203; note that for clarity no LEDs, LED boards, light directing and/or light redirecting devices, or electrical connections are illustrated (see FIGS. 17-18C, and 36 for examples of at least some of the aforementioned). Fixture 2000 may additionally include a surface 205 for mating to a knuckle (later discussed). A vent 204 to the internal space is positioned on housing 202 or elsewhere. Fasteners 301 removably attach housing 202 to substrate 200.

Figure 26:
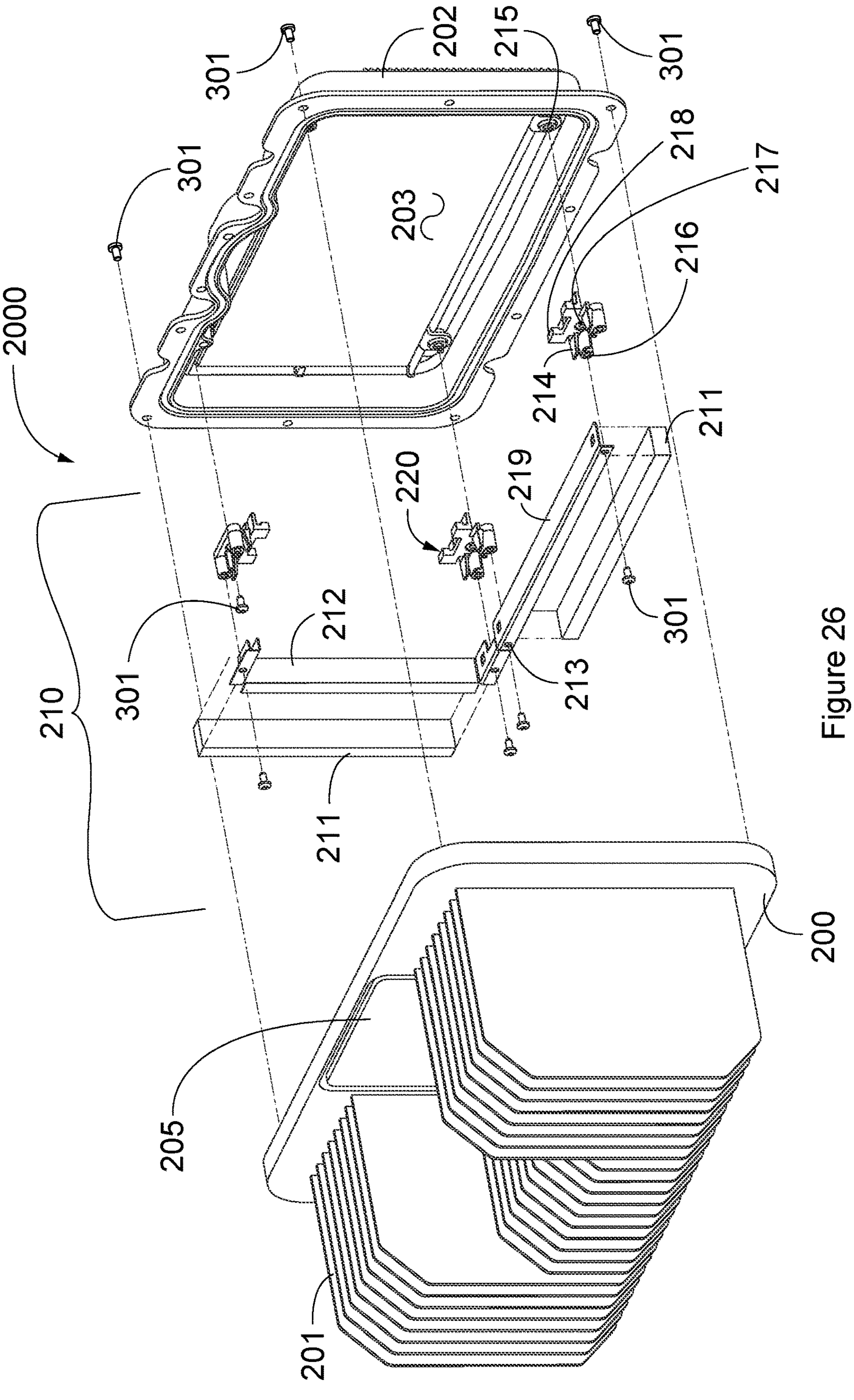
FIGS. 26 and 27 illustrate various views of the fixture of FIGS. 19-25 as modified according to aspects of the present invention; here an embodiment according to aspects of the claimed invention including a flexible carrier body with embedded desiccant with associated structure adapted to affix the desiccant in situ proximate one or more edges of an inner surface of the emitting face glass of the lighting fixture.
Figure 27:
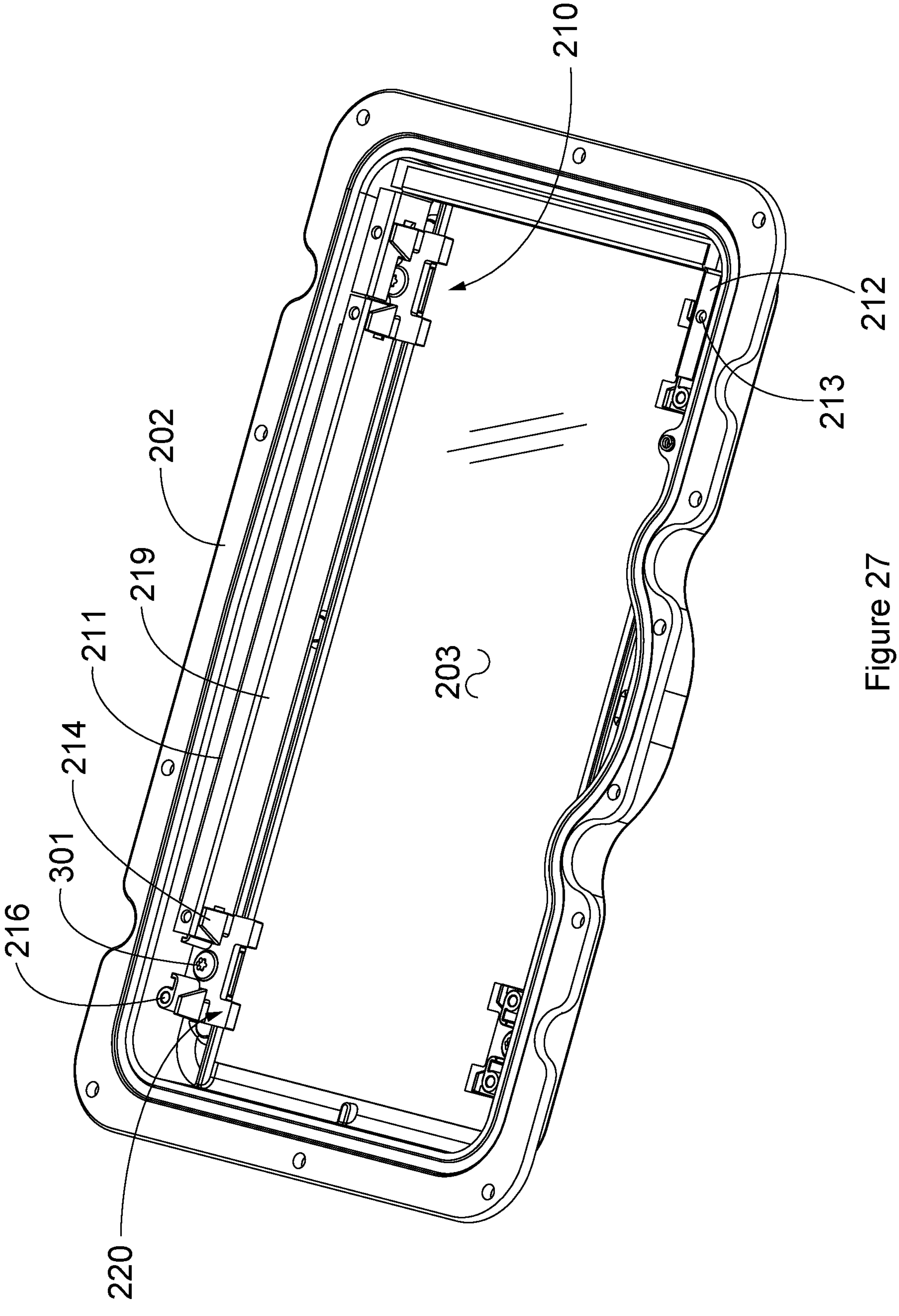
Figure 28:
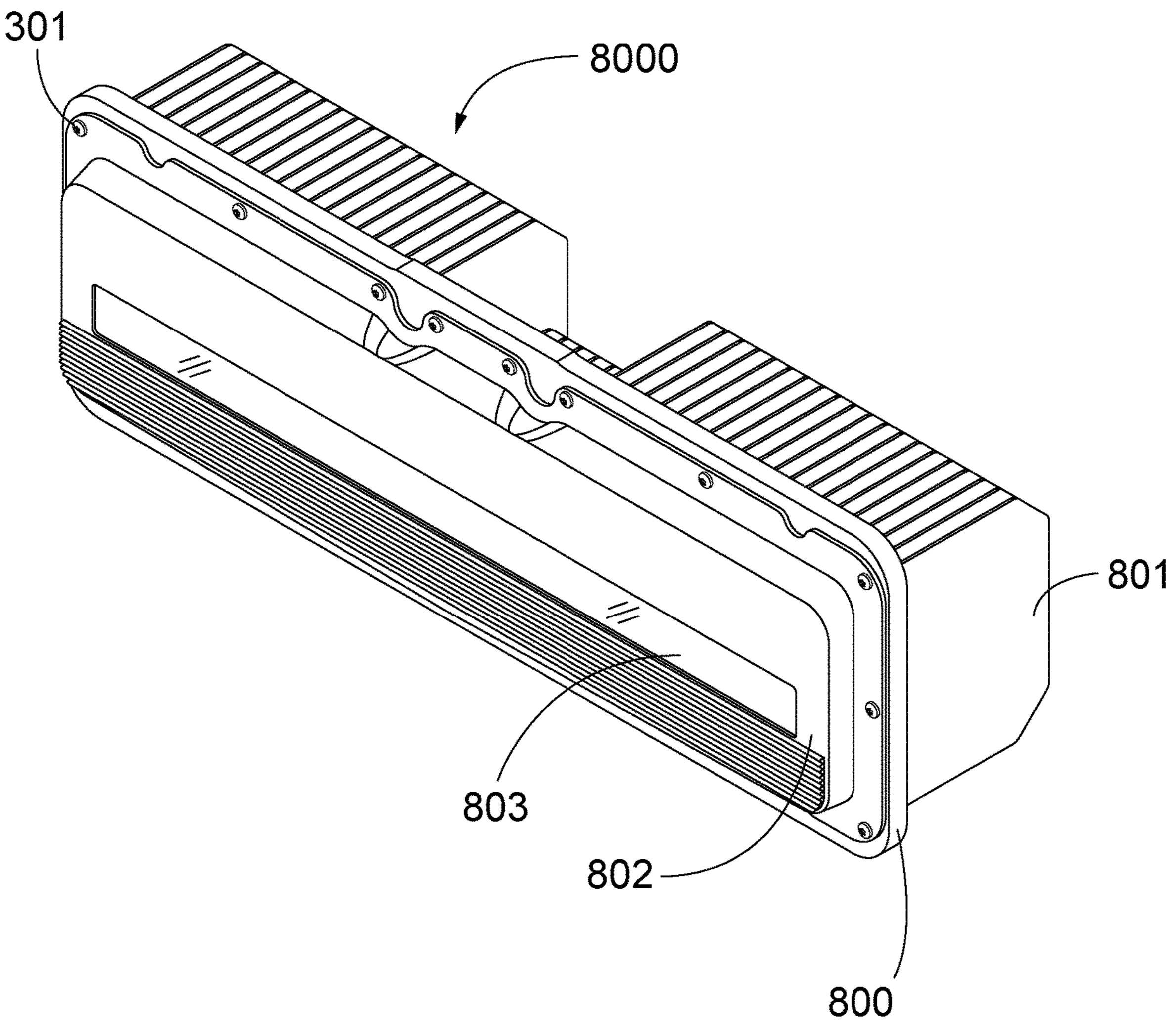
FIGS. 28-34 illustrate various views of another alternative design of an outdoor and/or specialty LED lighting fixture which might experience condensation under at least some operating conditions; note that FIGS. 28-34 do not illustrate the lighting fixture in any particular operational orientation/aiming.
Figure 29:
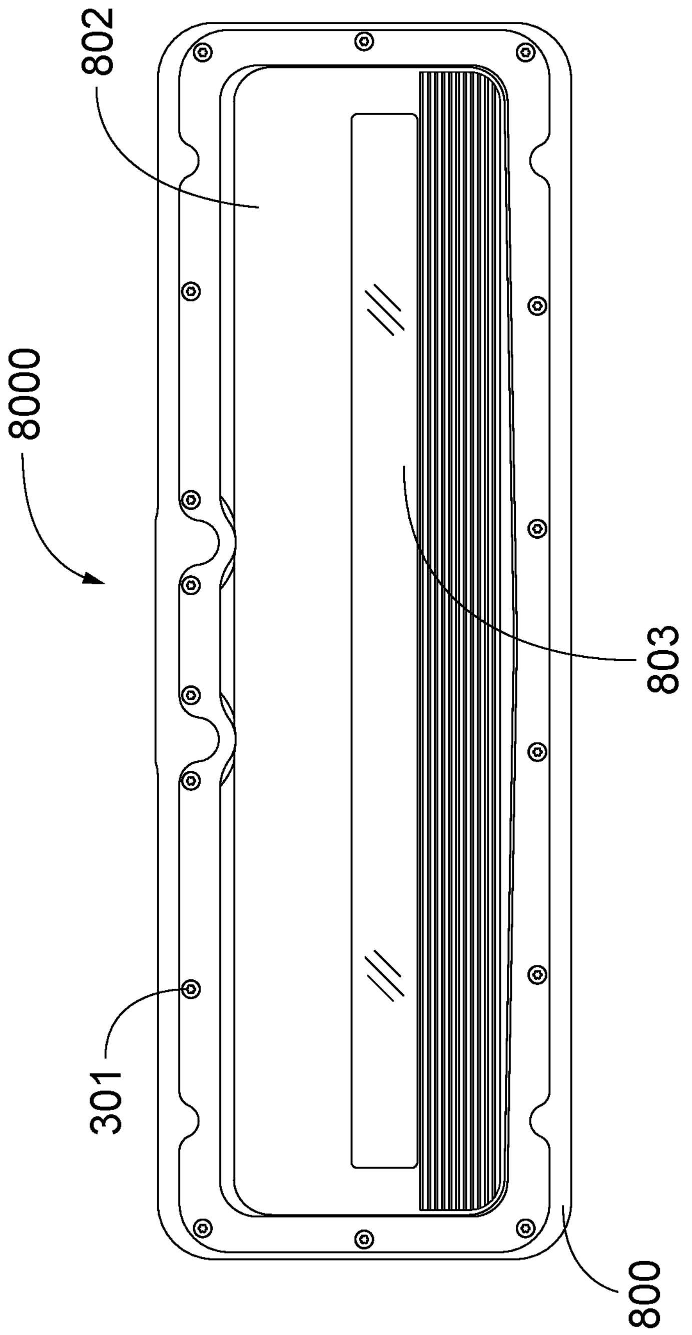
Figure 30:
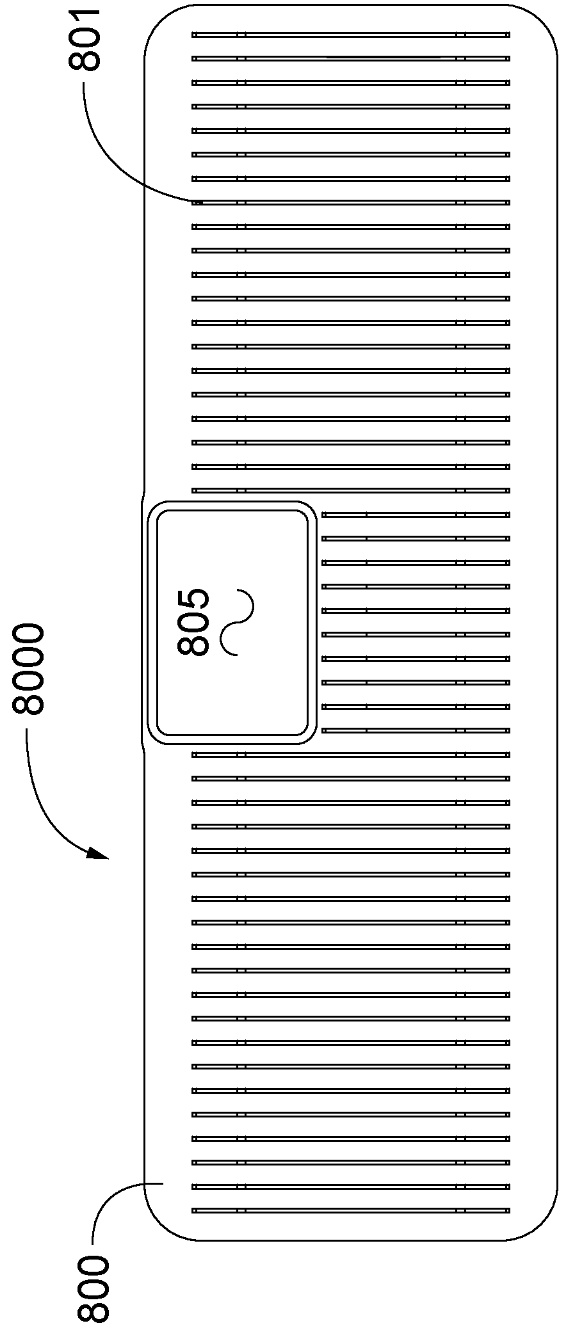
Figure 31:
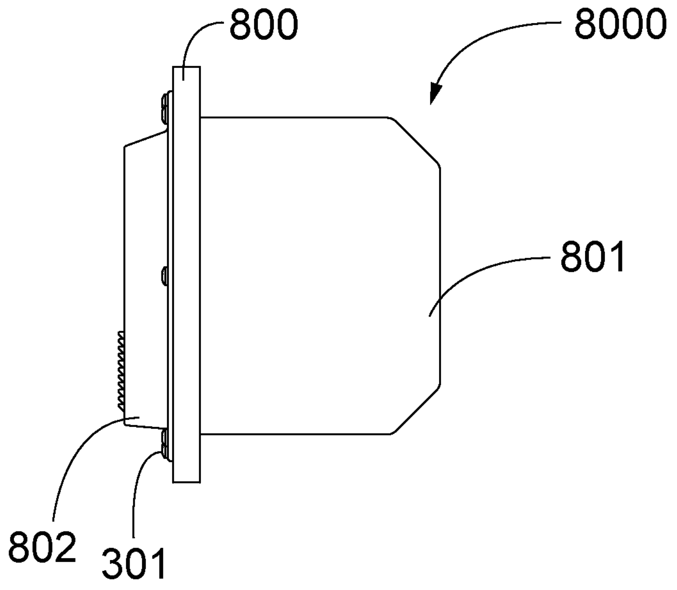
Figure 32:
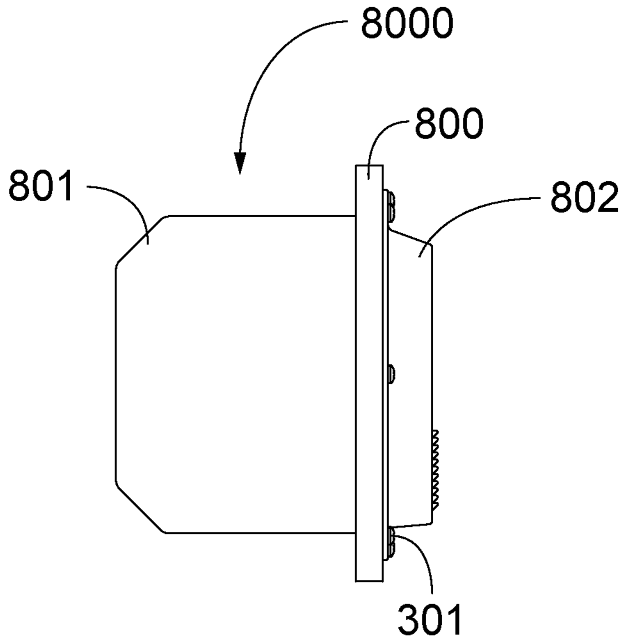
Figure 33:
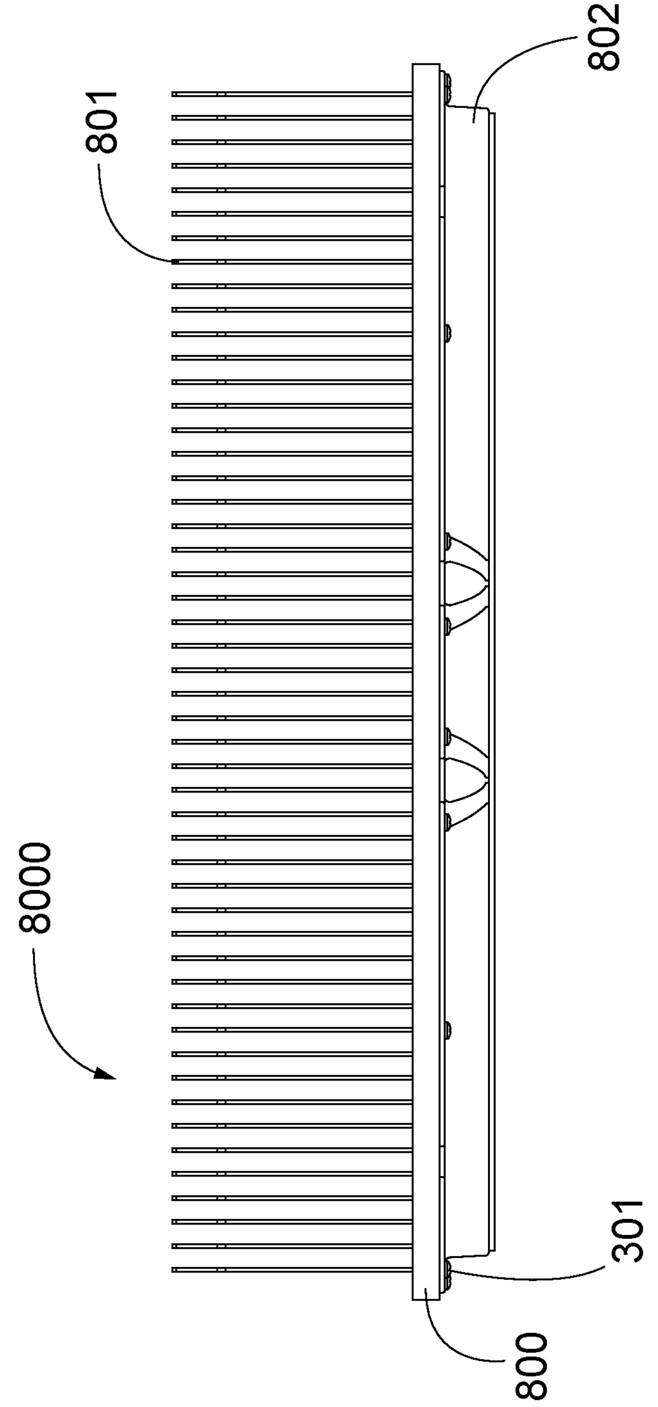
Figure 34:
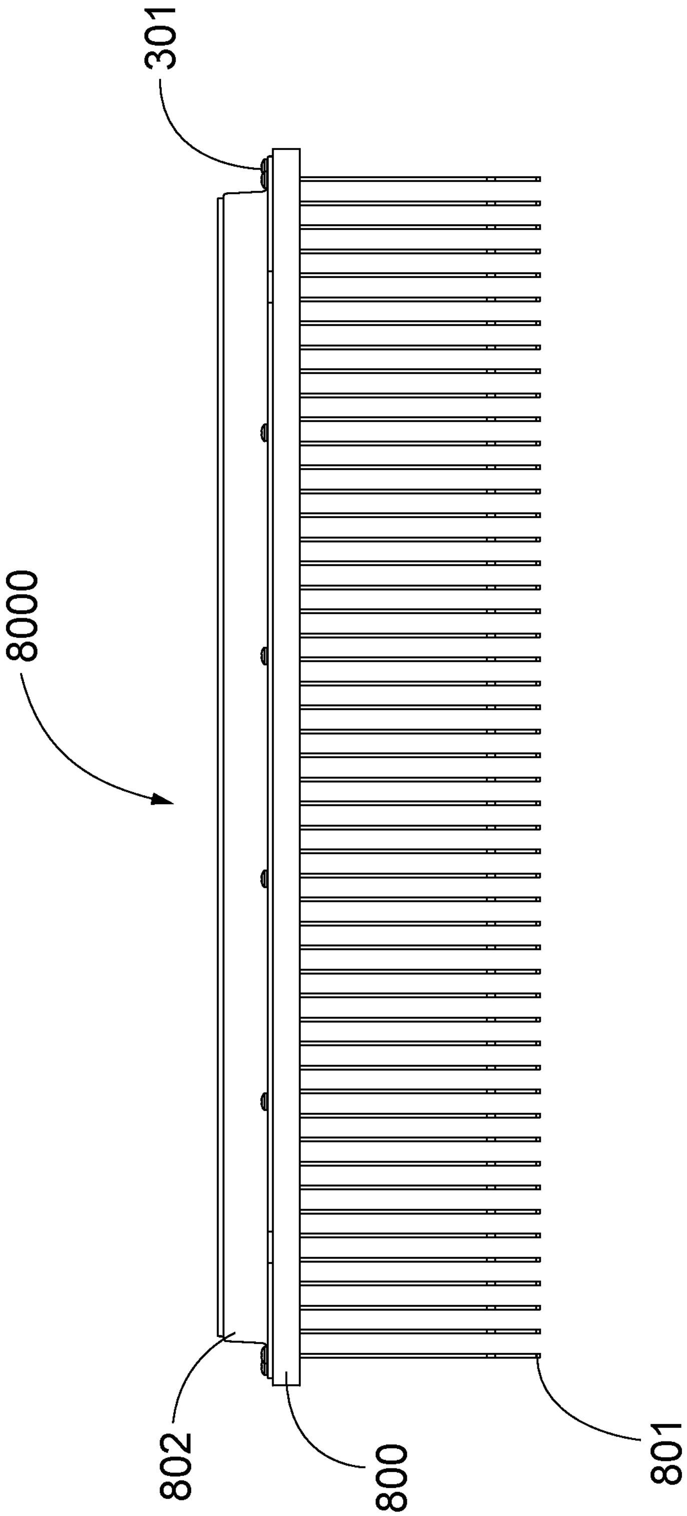

FIGS. 26 and 27 illustrate various views of the fixture of FIGS. 19-25 as modified according to this embodiment. Here, desiccant is embedded in a flexible carrier body, and the combination of desiccant and carrier body can be cut to size, flexed into a desired shape, and secured in situ. As such, such flexible desiccant can be flexed around one or more sides of glass 203 (e.g., so to approximate the perimeter of glass 203); if operation shows condensation occurs at some sides of glass 203 but not others, carrier body/desiccant 211 can be installed at just those sides (e.g., to save cost).

In one non-limiting example, it has been found that structural foam spacers traditionally used in window insulation (e.g., model SUPER SPACER® TriSeal™ Premium available from Edgetech (UK) Ltd, Coventry, England) work well to promote the benefits of gathering and trapping at least some of what otherwise might result in the moisture producing undesirable optical effects in a lighting fixture. The SUPER SPACER® material is an extruded, thermoset polymer structural silicone foam spacer with integrally incorporated desiccants. It is thermoset and can not be reshaped through reheating, retains its flexibility over a wide temperature range, and has excellent resistant to ozone, sunlight, and oxidation. It does not blister or bubble. It comprises a carrier which is a flexible gas and liquid permeable material defining a volume, and the desiccant is distributed throughout the volume. It is marketed for perimeter insulation for sealed insulting glass units for sealing, energy efficiency, spacing of glazing from its framework, and compensating of glazing stresses. Further details can be found at en.quanex.com/broschuren/and select "IG Manufacturers Bochure (DIN A4)(PDF), accessed May 25, 2021 at https://en.quanex.com/broschuren/. It can be purchased in a variety of sizes. Examples include a few millimeters in height (e.g. 3-8 mm), by a few millimeters in width (5-20 mm) by rolls that can be many feet in length (and then cut to length for applications). As such, for these types of insulating strips for glazing of these types of sizes, it can be reverse engineered how much internal volume for a given strip height and width cut to a certain length, so its moisture-absorbing capacity and desiccant efficiency can be roughly estimated. Empirical testing or information from manufacturers can also reveal the same; see again discussion regarding method 7000.

In this example of Super Spacer® insulator strip material, the foam is a rectangular in cross-section spacer tube and has a desiccant (3A molecular-sieve; 47% minimum by weight) embedded in the foam. It is shipped in sealed bags to retain desiccant protection prior to installation and use. One example of a desiccant is silica gel. Others are possible (activated charcoal, calcium sulfate, calcium chloride, and molecular sieves (e.g. zeolite spheroids). However, as will be appreciated, other flexible material with desiccant properties and types can be used, whether or not with other features such as vapor barriers and the like that, for example, are included in window insulation strips or materials.

As can be seen from FIGS. 26 and 27, in this embodiment a positioning assembly 210 is used to mount the flexible carrier containing desiccant in its operational orientation. Assembly 210 includes a device 220, carrier body/desiccant 211, and one or more rigid members 212/219 formed from sufficiently thin material (e.g., 0.030" thick sheet aluminum) which can be drilled, scored and bent, or otherwise adapted to secure carrier body/desiccant 211 in an operational orientation. Here device 220 includes a central aperture portion 221 through which a fastening device 301 extends and threads into or otherwise comes into operative connection with a receiver 215 which, together with portions 217 and 218 of device 220, clamps (or otherwise mounts) and positions emitting face glass 203 in situ on body 202. If desired, portion 216 of device 220 could be internally threaded so that a fastening device 301 could extend through aperture 213 of parts 212/219 and into part 216 so to effectively clamp down on carrier body/desiccant 211 (note that desiccant 211 is not pierced or threaded as it is sized to stop short of aperture 213 when fastening device 301 is present)—but this may not be necessary in some applications as oftentimes clip portions 214 of device 220 are sufficient to resiliently restrain parts 212/219 against a surface of portion 216 and effectively mount and position parts 212/219 in situ. As such, FIG. 26 illustrates that the flexible and elongated nature of desiccant 211 allows it to be used with positioning assembly(ies) 210 of a variety of configurations, both linear and with bends, curves, compound shapes, etc.; and positioning assembly(ies) 210 can cooperate with mounting members or hardware to position desiccant 211 at or near a desired internal position. Here, that position is proximate the interior side of face glass 203 but, in particular and beneficially, at or outside the perimeter of glass 203 so as not block any substantial portion of glass 203 in a way that materially affects operation of lighting fixture 2000, including blocking light designed to be emitted for illumination purposes. As will be appreciated, FIG. 26 shows a combination that places desiccant 211 in that position relative to glass 203 along a bottom edge and one side edge. Of course, similar positionings could be added along all or a portion of the top edge and the other side; or just along any one of the top, bottom, side, or opposite side edges (or any portion thereof), or any combination of the foregoing.

In this embodiment, the framing of face glass 203 includes body 202. Body 202 has a depth which extends the plane of face glass 203 away from the plane of substrate 200. This provides depth for placement of positioning structure(s) 210 and desiccant 211 around but near face glass 203 (see, in particular, FIG. 27).

Note further that in this embodiment the perimeter of face glass 203, as well as the perimeter of body 202, are smaller in area than substrate 200 (compare that to face glass 103 perimeter area and expanding perimeter area of body 102 relative to smaller perimeter area of substrate 100 of embodiments 1-4). As such, this stepping down of perimeter areas from substrate 200, to body 202, to then face glass 203 presents challenges to positioning desiccant close to but without substantial interference with face glass 203. In FIG. 26, the framing around the perimeter of face glass 203 further allows positioning assembly(ies) 210 to mount near face glass 203 without blocking or obstructing the face glass.

Benefits of the present embodiment are such that (i) because assembly 210 is located behind portions of housing 202 and not directly viewable through emitting face glass 203, it is not likely useful light will be impacted, (ii) the present approach can be readily implemented in a factory setting and therefore an amount/type/capacity of desiccant can be selected such that field repairs are never needed during an anticipated fixture lifespan, and (iii) the present embodiment is a lower cost option than at least some other embodiments. That being said, the present embodiment uses a smaller overall amount of desiccant as compared to at least some other embodiments (here because both the internal space of fixture 2000 and available mounting locations is limited compared to, for example, fixture 1000) so it is possible in at least some extreme operating conditions field replacements of carrier body/desiccant 211 may be needed.

I. Exemplary Apparatus Embodiment

Figure 38:
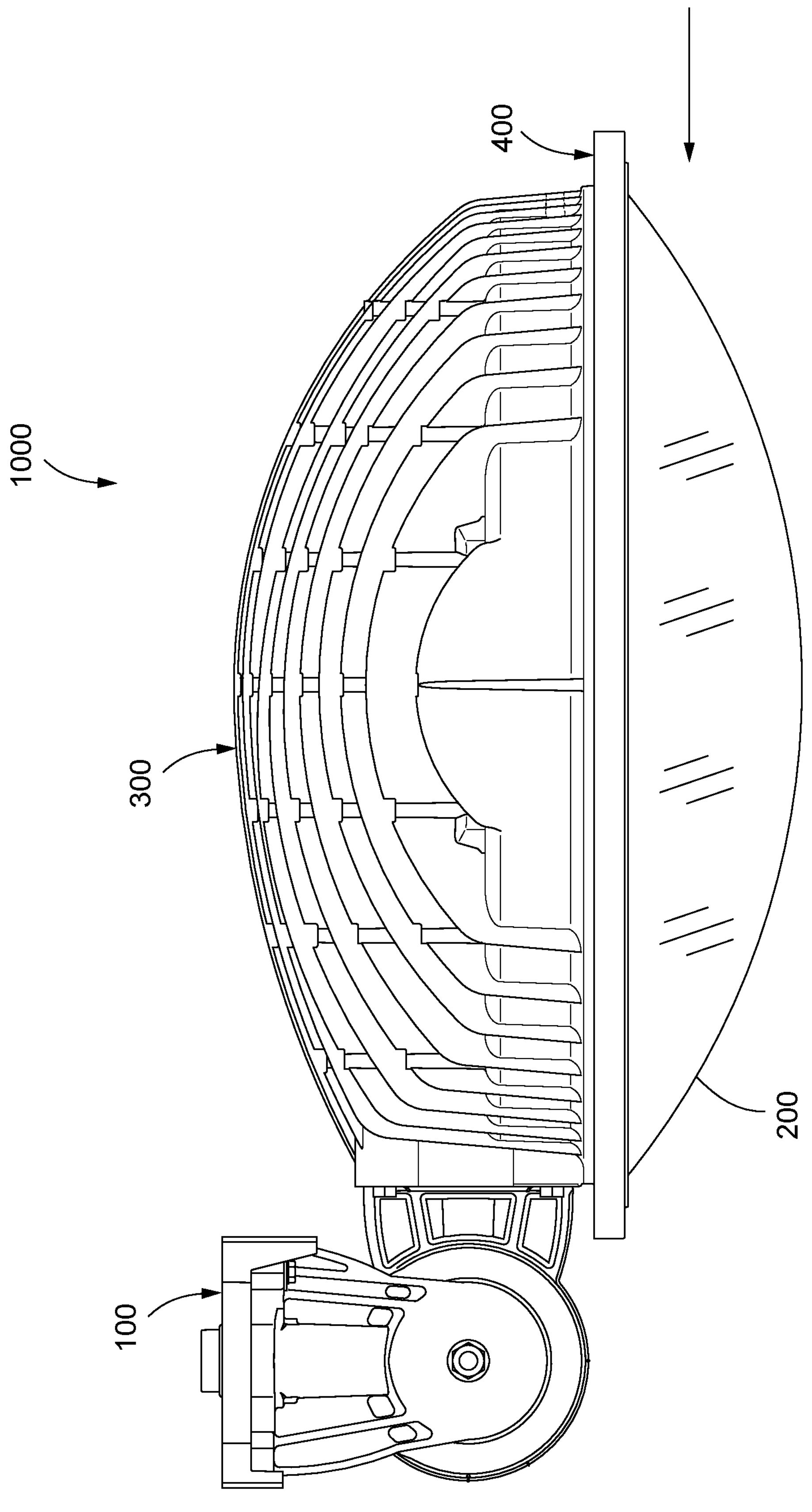
FIG. 38 illustrates one possible option for a knuckle for use with at least some embodiments (also referred to as an adjustable armature) for mounting any of the aforementioned lighting fixtures to a pole, crossarm, or other elevating structure; here, reproducing FIG. 2 of incorporated U.S. Patent Publication No. 2014/0092593.
Figure 39:
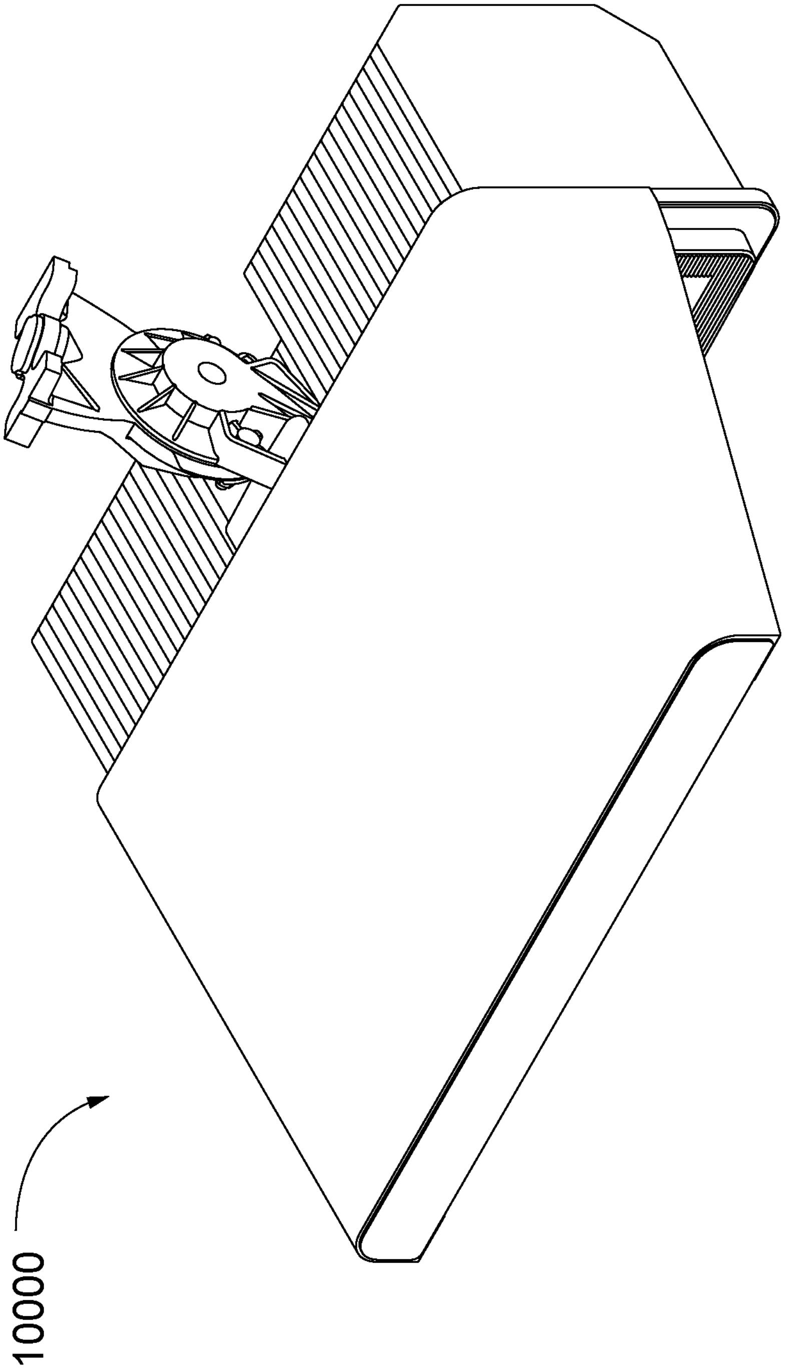
FIGS. 39 and 40 illustrate two possible alternative designs of LED lighting fixtures which may be used with one or more of the embodiments of the present invention; here fixtures 10000 and 11000 including knuckles and external visors to better ensure light emitted from the LEDs contained therein produces useful light.
Figure 40:
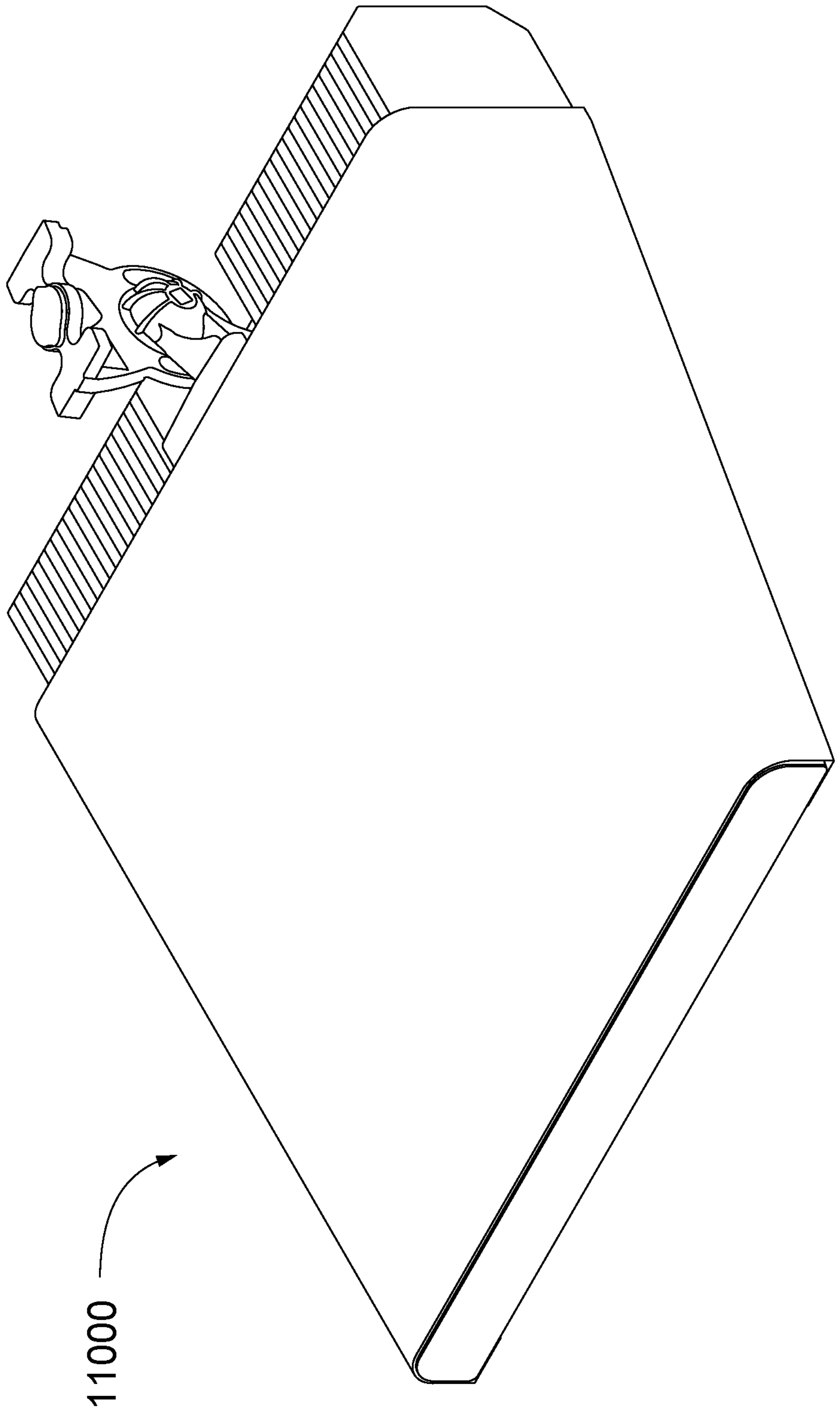

FIGS. 28-34 illustrate another alternative design of an outdoor and/or specialty LED lighting fixture which might experience condensation under at least some operating conditions; here again a square, rectangular, or otherwise shaped lighting fixture which has angular features where moisture may condense (as opposed to round-like features with defined curvature/hemispheres as in Embodiments 1-4)—but with different features on surfaces external to the internal space of the fixture and which aid in producing useful light (here, ribbing on housing 802). FIGS. 38-40 (later discussed) illustrate additional external features (e.g., knuckles, external visors) which contribute to providing useful light.

Like the previous embodiment, in addition to said housing 802 fixture 8000 includes a thermally conductive substrate 800 which acts as the mounting surface for LEDs on one side (i.e., the side internal to the fixture), and which also acts as the mounting surface for one or more heat sink/radiating fins 801 on one side (i.e., the side generally opposite to the LED surface side and external to the fixture), as well as a mating surface 805 to affix the lighting fixture to a knuckle. Further, fixture 8000 includes an internal space defined by one side of substrate 800, inner surfaces of walls of housing 802, and an inner surface of an emitting face glass 803. Note that for clarity no LEDs, LED boards, light directing and/or light redirecting devices, or electrical connections are illustrated (see FIGS. 17-18C, and 36 for examples of at least some of the aforementioned).

FIGS. 35 and 36 illustrate various views of the fixture of FIGS. 28-34 as modified according to a still further embodiment. As in the previous embodiment, desiccant is embedded in a flexible carrier body; however, unlike that embodiment, here desiccant 211 is clamped (or otherwise mounted and/or positioned in situ) via structure affixed to thermally conductive substrate 800 and proximate the LED light source, rather than the lighting fixture housing and proximate the emitting face (as in the previous embodiment). As can be seen from FIGS. 35 and 36, desiccant 211 is positionally affixed in rigid members 223/225 (which are similar in composition and function to parts 212/219) and, optionally, in combination with spacers 222/226 are positioned proximate array of LED lights sources 9000 when parts 223/225 are secured (here, via fastening devices 301 through apertures 224/213, respectively, and into complementary threaded holes 806). Here, spacer 222 serves another purpose—it acts as a wire management system (e.g., for containing and restraining wiring for the LEDs)—and spacer 226 serves another purpose—it acts to hold a filter—but this is specific to the design and operation of fixture 8000, and so parts 222/226 may not be present in all applications of this embodiment.

Benefits of the present embodiment are such that (i) since desiccant 211 is physically near the parts most likely to release moisture (i.e., LED array 9000), moisture is rapidly collected and removed before it can condense on emitting face glass 803, (ii) the present approach can be readily implemented in a factory setting and therefore an amount/type/capacity of desiccant can be selected such that field repairs are never needed during an anticipated fixture lifespan, and (iii) the present embodiment is a lower cost option than at least some other embodiments. That being said, the present embodiment uses a smaller overall amount of desiccant as compared to at least some other embodiments (here because both the internal space of fixture 2000 and available mounting locations is limited compared to, for example, fixture 1000) so it is possible in at least some extreme operating conditions field replacements of carrier body/desiccant 211 may be needed.

INDUSTRIAL APPLICABILITY

The invention may take many forms and embodiments. The foregoing examples are but a few of those. To give some sense of some options and alternatives, a few examples are given below.

As has been stated, condensation on the interior side of a glass at the emitting face of an LED lighting fixture can be undesirable because it impacts the transmission of light from inside the fixture to outside the fixture to the target area; namely, it reduces the usefulness of light. This could be a concern with fixtures of a different design than those illustrated herein, with light sources other than LEDs, with different or additional light directing and/or light redirecting devices, with different operational orientations, with different styles of fixture glass, and under operating conditions other than those discussed herein. For example, lighting fixtures and/or glass could be rounded and/or having pronounced curvature (as in Embodiments 1-4, and FIGS. 18A-C and 38), or may be rectangular, square, wedge-shaped, or having some angular surface and/or edges (as in Embodiments 5 and 6, and FIGS. 37, 39, and 40). The lighting fixture design itself may differ in terms of parts at a general level—for example, fixture 8000 does not include a membrane vent—or at a very specific level—for example, the light directing devices of array 9000 of LED light sources differ in design from light directing device 10E of LED light source 10 of FIG. 17 (LED light source 10 further including a light redirecting device 10F). All are possible options and alternatives envisioned according to aspects of the present invention.

Figure 37:
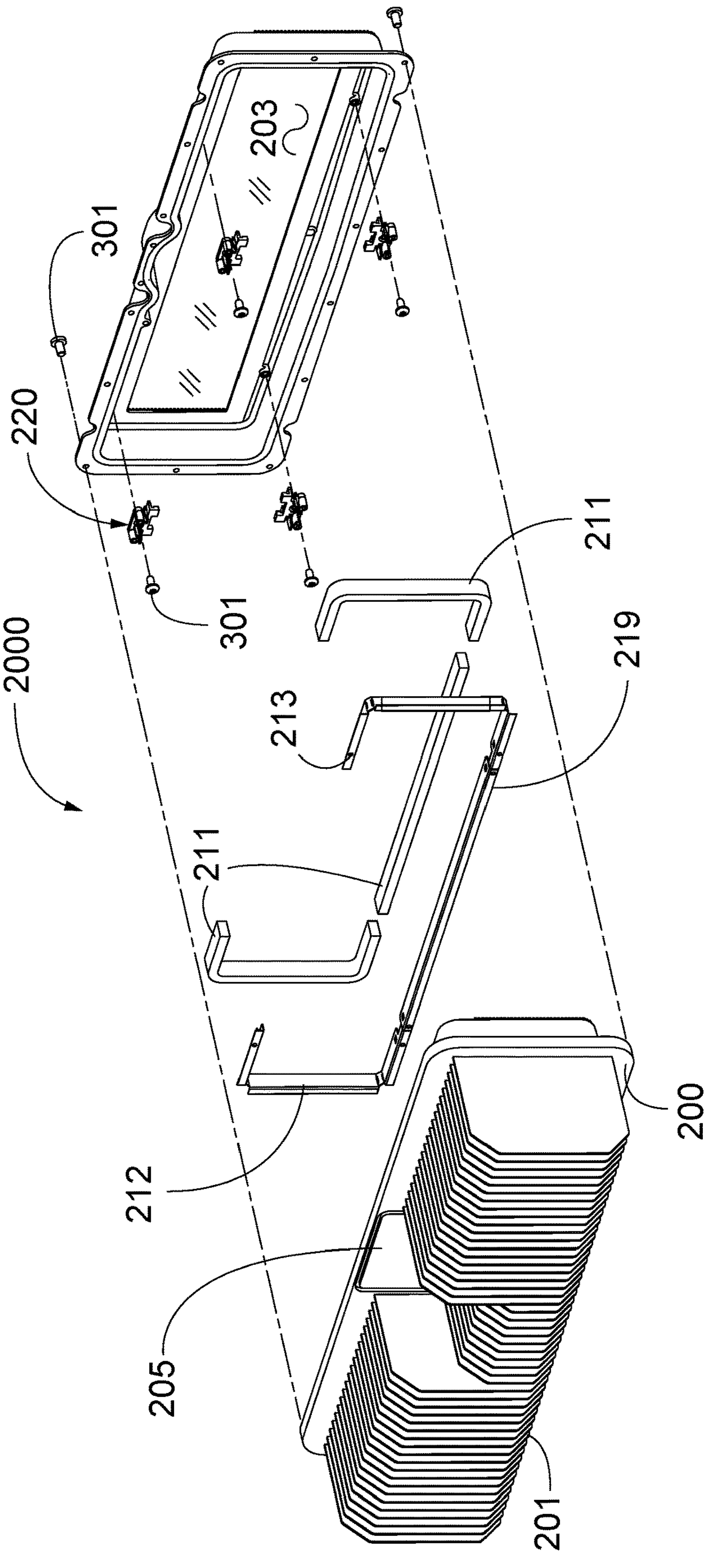
FIG. 37 illustrates one possible option or alternative for both shape of desiccant and quantity of fastening devices; here, showing said flexible carrier body with embedded desiccant bent or otherwise formed in shape, and omitting fastening devices in parts 212/219 for clarity.

Further, while specific desiccant forms, shapes, and materials have been discussed herein, others are possible—for example, in some embodiments, desiccant can be solid, loose, bagged, etc. and in others desiccant is embedded in a flexible carrier—and in such an event, certain devices may likewise take on a different shape or form (e.g., perforations in parts 501, 602, and 601 may be larger, smaller, rounder, more square, etc.). FIG. 37, for example, illustrates the aforementioned flexible carrier body with embedded desiccant 211 bent or otherwise formed to match a general curvature of emitting face glass 203.

With further regards to options and alternatives, discussion has been given herein to light directing devices, light redirecting devices, and the glass which seals against the emitting face of a lighting fixture; while some optical properties have been discussed (e.g., anti-reflective properties, beam shaping, light transmission), it is important to note that a wide variety of optical properties exist, and any lighting fixtures or devices having such may likewise benefit from aspects according to the present invention. For example, "glass" as it has been used herein describes a device which seals or closes against the open or emitting face of a lighting fixture; said glass could be fully transmissive, or translucent, or coated with a filter or a color gel, for example. As another example, at least some light directing and/or light redirecting devices may exist outside the internal space of the lighting fixtures. FIG. 38 illustrates a knuckle assembly 100 (again, using the numbering from incorporated U.S. Patent Publication No. 2014/0092593) which can be pivoted in both vertical (i.e., about its connection point to a crossarm or other elevating structure) and horizontal (i.e., about its mid-point bolt) planes to provide light redirection of an entire LED lighting fixture when said fixture is affixed to said knuckle (i.e., at mating surface 205/805). FIGS. 39 and 40 illustrate LED lighting fixtures 10000 and 11000, respectively, with different designs of knuckle and also including visors (i.e., light redirecting devices) outside the internal space of the LED lighting fixtures. All are possible options and alternatives envisioned according to aspects of the present invention.

Lastly, reference has been given herein to fastening devices, and devices which are mounted or affixed to a surface; it is important to note that a variety of means exist to join, abut, or affix devices in a removable or permanent fashion (e.g., taping, gluing, welding, etc.), and that all are possible, and envisioned. For example, many embodiments are described as having to break a seal to be installed in a field repair situation. In many instances, rather than remove the glass of a fixture, existing apertures (e.g., from a removed or modified membrane vent) could be retrofitted in a permanent fashion (e.g., by installing brackets inside the aperture against an inner surface/wall of the fixture) to hold temporary desiccant packets or structure filled with desiccant in an operational orientation such that, when desired, a "used" packet or carrier of desiccant can be removed from such a "port" and replaced with a new one, and then, if required sealed (e.g., via a cap) or otherwise positioned. In this sense both permanent and temporary means are used to provide an adequate solution; this and all of the aforementioned is possible, and envisioned. Also, it is to be understood that fastening devices in general may differ in quantity, form, or type depending on the needs of an application. For example, FIG. 37 illustrates fixture 2000 with no fastening devices in parts 212 and 219, even though there are apertures 213 in said parts. For some applications the structure of device assembly 220 is sufficient to resiliently retain parts 212/219, and by extension, desiccant 211 without at least some quantity of fastening devices. Again, all of the aforementioned are possible, and envisioned.

What is claimed is:

1. A method to reduce moisture in a lighting fixture comprising:

piping, foaming or forming a moldable desiccant material into an internal space of the lighting fixture in place relative to a portion of the lighting fixture; and breaking a seal before the piping, foaming or forming the moldable desiccant into an internal space of the lighting fixture is performed;

wherein the moldable desiccant is affixed to the portion of the lighting fixture and is restrained to the portion of the lighting fixture.

* * * * *